US012706027B2

(12) United States Patent
Hwang

(10) Patent No.: US 12,706,027 B2
(45) Date of Patent: Aug. 11, 2026

(54) STAGE CIRCUIT AND DISPLAY DEVICE INCLUDING THE SAME, AND ELECTRONIC DEVICE

(71) Applicant: Samsung Display Co., LTD., Yongin-si (KR)

(72) Inventor: Jung Hwan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/026,099

(22) Filed: Jan. 16, 2025

(65) Prior Publication Data

US 2025/0336336 A1 Oct. 30, 2025

(30) Foreign Application Priority Data

Apr. 26, 2024 (KR) ........................ 10-2024-0056256

(51) Int. Cl.
*G09G 3/32* (2016.01)
*G09G 3/3266* (2016.01)

(52) U.S. Cl.
CPC ............ *G09G 3/32* (2013.01); *G09G 3/3266* (2013.01); *G09G 2310/0267* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 11,610,530 | B2 | 3/2023 | Park et al. | |
| 2023/0206853 | A1* | 6/2023 | Kim | G09G 3/3233 345/204 |
| 2025/0078753 | A1* | 3/2025 | Kim | G09G 3/3233 |
| 2025/0299625 | A1* | 9/2025 | Park | G09G 3/32 |

* cited by examiner

*Primary Examiner* — Ifedayo B Iluyomade
(74) *Attorney, Agent, or Firm* — Womble Bond Dickinson (US) LLP

(57) ABSTRACT

A display device includes: a display unit including pixels located to be connected to scan lines and data lines; and a scan driver including stage circuits to drive the scan lines, wherein the stage circuits are configured to: generate a carry signal, using an auxiliary clock signal swinging between a first voltage and a second voltage, a first auxiliary power source having the first voltage, and a second auxiliary power source having the second voltage; and generate a scan signal, using a clock signal swinging between a third voltage higher than the first voltage and a fourth voltage lower than the second voltage, a first power source having the third voltage, and a second power source having the fourth voltage.

21 Claims, 17 Drawing Sheets

STAGE CIRCUIT AND DISPLAY DEVICE INCLUDING THE SAME, AND ELECTRONIC DEVICE

CROSS-REFERENCE TO RELATED APPLICATION

The present application claims priority to and the benefit of Korean patent application No. 10-2024-0056256 filed on Apr. 26, 2024, in the Korean Intellectual Property Office, the entire disclosure of which is incorporated herein by reference.

BACKGROUND

1. Field

Aspects of some embodiments of the present disclosure generally relate to a stage circuit and a display device including the same, and electronic device.

2. Description of the Related Art

As the information society has developed, consumer demand for display devices for displaying images has increased in various forms. For example, display devices may be applied to various electronic devices such as smartphones, digital cameras, notebook computers, navigation systems, and smart televisions.

A display device displays images, using pixels. The display device may include a scan driver to drive the pixels. The scan driver may include stage circuits, and supply at least one scan signal to each of scan lines for each frame, using the stage circuits.

The above information disclosed in this Background section is only for enhancement of understanding of the background and therefore the information discussed in this Background section does not necessarily constitute prior art.

SUMMARY

Aspects of some embodiments include a stage circuit and a display device including the same, which may be capable of relatively reducing power consumption.

Aspects of some embodiments also include a stage circuit and a display device including the same, which can relatively stably supply a scan signal when at least two areas of a display unit are driven at different driving frequencies.

Aspects of some embodiments also include a stage circuit and a display device including the same, which can output scan signals having different polarities (or voltages).

According to some embodiments of the present disclosure, a stage circuit includes: an input unit located between a first input terminal to which a scan start signal or a carry signal is input and a first node, the input unit controlling an electrical connection between the first input terminal and the first node, corresponding to an auxiliary clock signal input to a second input terminal; a first voltage controller connected to a first main power input terminal and a second main power input terminal, the first voltage controller controlling each of a second node, a third node, and a fourth node to have a voltage higher or lower than a voltage of the first node; a first output unit connected to a third input terminal to which a clock signal is input and the first main power input terminal, the first output unit outputting a first scan signal to a first output terminal, corresponding to the voltage of each of the second node and the third node; a second output unit connected to a first auxiliary power input terminal and a second auxiliary power input terminal, the second output unit outputting a carry signal to a second output terminal, corresponding to the voltage of each of the third node and the fourth node; and a second voltage controller connected to the first auxiliary power input terminal, the second voltage controller being connected to the second main power input terminal or the second auxiliary power input terminal, the second voltage controller being located between the first node and the third node to maintain the voltage of the third node.

According to some embodiments, the auxiliary clock signal and the clock signal may have the same cycle and different phases. According to some embodiments, the auxiliary clock signal may swing between a first voltage and a second voltage, and the clock signal may swing between a third voltage higher than the first voltage and a fourth voltage lower than the second voltage.

According to some embodiments, an auxiliary first power source having the first voltage may be input to the first auxiliary power input terminal, an auxiliary second power source having the second voltage may be input to the second auxiliary power input terminal, a first power source having the third voltage may be input to the first main power input terminal, and a second power source having the fourth voltage may be input to the second main power input terminal.

According to some embodiments, the second voltage controller may include an N-type first voltage control transistor and a P-type second voltage control transistor, which are connected in series between the first node and the third node. According to some embodiments, a gate electrode of the first voltage control transistor may be connected to the first auxiliary power input terminal, and a gate electrode of the second voltage control transistor may be connected to the second main power input terminal.

According to some embodiments, the second voltage controller may include an N-type first voltage control transistor and a P-type second voltage control transistor, which are connected in series between the first node and the third node. According to some embodiments, a gate electrode of the first voltage control transistor may be connected to the first auxiliary power input terminal, and a gate electrode of the second voltage control transistor may be connected to the second auxiliary power input terminal.

According to some embodiments, the input unit may include a first transistor connected between the first input terminal and the first node, the first transistor including a gate electrode connected to the second input terminal.

According to some embodiments, the first output unit may include: a first scan output transistor connected between the third input terminal and the first output terminal, the first scan output transistor including a gate electrode connected to the second node; a second scan output transistor connected between the first output terminal and the first main power input terminal, the second scan output transistor including a gate electrode connected to the third node; a control transistor connected between the second node and the fourth node, the control transistor including a gate electrode connected to the second main power input terminal; and a first capacitor connected between the second node and the first output terminal.

According to some embodiments, the second output unit may include: a first carry output transistor connected between the first auxiliary power input terminal and the second output terminal, the first carry output transistor including a gate electrode connected to the fourth node; and a second carry output transistor connected between the second output terminal and the second auxiliary power input terminal, the second carry output transistor including a gate electrode connected to the third node.

According to some embodiments, the first voltage controller may include: a first control transistor connected between the first main power input terminal and a fifth node, the first control transistor including a gate electrode connected to the fourth node; a second control transistor connected between the fifth node and the second main power input terminal, the second control transistor including a gate electrode connected to the third node; a third control transistor connected between the first main power input terminal and the fourth node, the third control transistor including a gate electrode connected to the fifth node; a fourth control transistor connected between the fourth node and the second main power input terminal, the fourth control transistor including a gate electrode connected to the third node; and a second capacitor connected between the fifth node and the third node.

According to some embodiments, each of the first control transistor, the second control transistor, and the third control transistor may be a P-type transistor, and the fourth control transistor may be an N-type transistor.

According to some embodiments, the stage circuit may further include a third output unit connected to the first main power input terminal and the second main power input terminal, the third output unit outputting a second scan signal to a third output terminal, corresponding to the voltage of each of the third node and the fourth node.

According to some embodiments, the third output unit may include: a first output transistor connected between the first main power input terminal and the third output terminal, the first output transistor including a gate electrode connected to the fourth node; a second output transistor connected between the third output terminal and the second main power input terminal, the second output transistor including a gate electrode connected to the third node; and a third capacitor connected between the third node and the third output terminal.

According to some embodiments of the present disclosure, a a stage circuit includes: a first output unit configured to output a scan signal, using a clock signal and a first power source; an input unit configured to receive a scan start signal or a carry signal, corresponding to an auxiliary clock signal having a voltage different from a voltage of the clock signal; and a second output unit configured to output a carry signal, using an auxiliary first power source and an auxiliary second power source, each of which has a voltage different from a voltage of the first power source.

According to some embodiments, the auxiliary clock signal and the clock signal may have the same cycle and different phases. According to some embodiments, the auxiliary clock signal may swing between a first voltage and a second voltage, and the clock signal may swing between a third voltage higher than the first voltage and a fourth voltage lower than the second voltage.

According to some embodiments, the auxiliary first power source may have the first voltage, the auxiliary second power source may have the second voltage, and the first power source may have the third voltage.

According to some embodiments of the present disclosure, a display device includes: a display unit including pixels located to be connected to scan lines and data lines; and a scan driver including stage circuits to drive the scan lines, wherein the stage circuits generate a carry signal, using an auxiliary clock signal swinging between a first voltage and a second voltage, a first auxiliary power source having the first voltage, and a second auxiliary power source having the second voltage, and generate a scan signal, using a clock signal swinging between a third voltage higher than the first voltage and a fourth voltage lower than the second voltage, a first power source having the third voltage, and a second power source having the fourth voltage.

According to some embodiments, when a first area of the display unit is driven at a first image refresh rate and a second area of the display unit is driven at a second image refresh rate lower than the first image refresh rate, the scan driver may generate the carry signal, corresponding to the first image refresh rate.

According to some embodiments, the display device may further include a timing controller configured to control the scan driver. According to some embodiments, the timing controller may control whether the clock signal is to be supplied such that the scan signal is output at the second image refresh rate in the second area.

According to some embodiments, each of the stage circuits may include a first input terminal, a second input terminal, a third input terminal, a first auxiliary power input terminal, a second auxiliary power input terminal, a first main power input terminal, a second main power input terminal, a first output terminal, and a second output terminal. According to some embodiments, a scan start signal or a carry signal of a previous stage circuit may be input to the first input terminal. According to some embodiments, a first auxiliary clock signal may be input to a second input terminal of an odd-numbered stage circuit, and a second auxiliary clock signal may be input to a second input terminal of an even-numbered stage circuit. According to some embodiments, a first clock signal may be input to a third input terminal of an odd-numbered stage circuit, and a second clock signal may be input to a third input terminal of an even-numbered stage circuit. According to some embodiments, the first auxiliary power source may be input to the first auxiliary power input terminal, the second auxiliary power source may be input to the second auxiliary power input terminal, the first power source may be input to the first main power input terminal, and the second power source may be input to the second main power input terminal. According to some embodiments, the first auxiliary clock signal and the second auxiliary clock signal may have the same cycle and different phases. According to some embodiments, the first clock signal and the second clock signal may have the same cycle and different phases.

According to some embodiments, each of the stage circuits may include an input unit located between the first input terminal and a first node, the input unit controlling an electrical connection between the first input terminal and the first node, corresponding to a voltage of the second input terminal; a first voltage controller connected to the first main power input terminal and the second main power input terminal, the first voltage controller controlling each of a second node, a third node, and a fourth node to have a voltage higher or lower than a voltage of the first node; a first output unit connected to the third input terminal and the first main power input terminal, the first output unit outputting the scan signal to a first output terminal, corresponding to the voltage of each of the second node and the third node; a second output unit connected to the first auxiliary power input terminal and the second auxiliary power input terminal, the second output unit outputting the carry signal to a second output terminal, corresponding to the voltage of each of the third node and the fourth node, and a second voltage controller connected to the first auxiliary power input terminal, the second voltage controller being connected to the second main power input terminal or the second auxiliary power input terminal, the second voltage controller being located between the first node and the third node to maintain the voltage of the third node.

According to some embodiments of the present disclosure, an electronic device includes: a processor to provide input image data; a display device to display an image based on the input image data. the display device includes: a display unit including pixels located to be connected to scan lines and data lines; and a scan driver including stage circuits to drive the scan lines, wherein the stage circuits generate a carry signal, using an auxiliary clock signal swinging between a first voltage and a second voltage, a first auxiliary power source having the first voltage, and a second auxiliary power source having the second voltage, and generate a scan signal, using a clock signal swinging between a third voltage higher than the first voltage and a fourth voltage lower than the second voltage, a first power source having the third voltage, and a second power source having the fourth voltage.

BRIEF DESCRIPTION OF THE DRAWINGS

Aspects of some embodiments according to the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will more fully convey the scope of embodiments according to the present disclosure to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
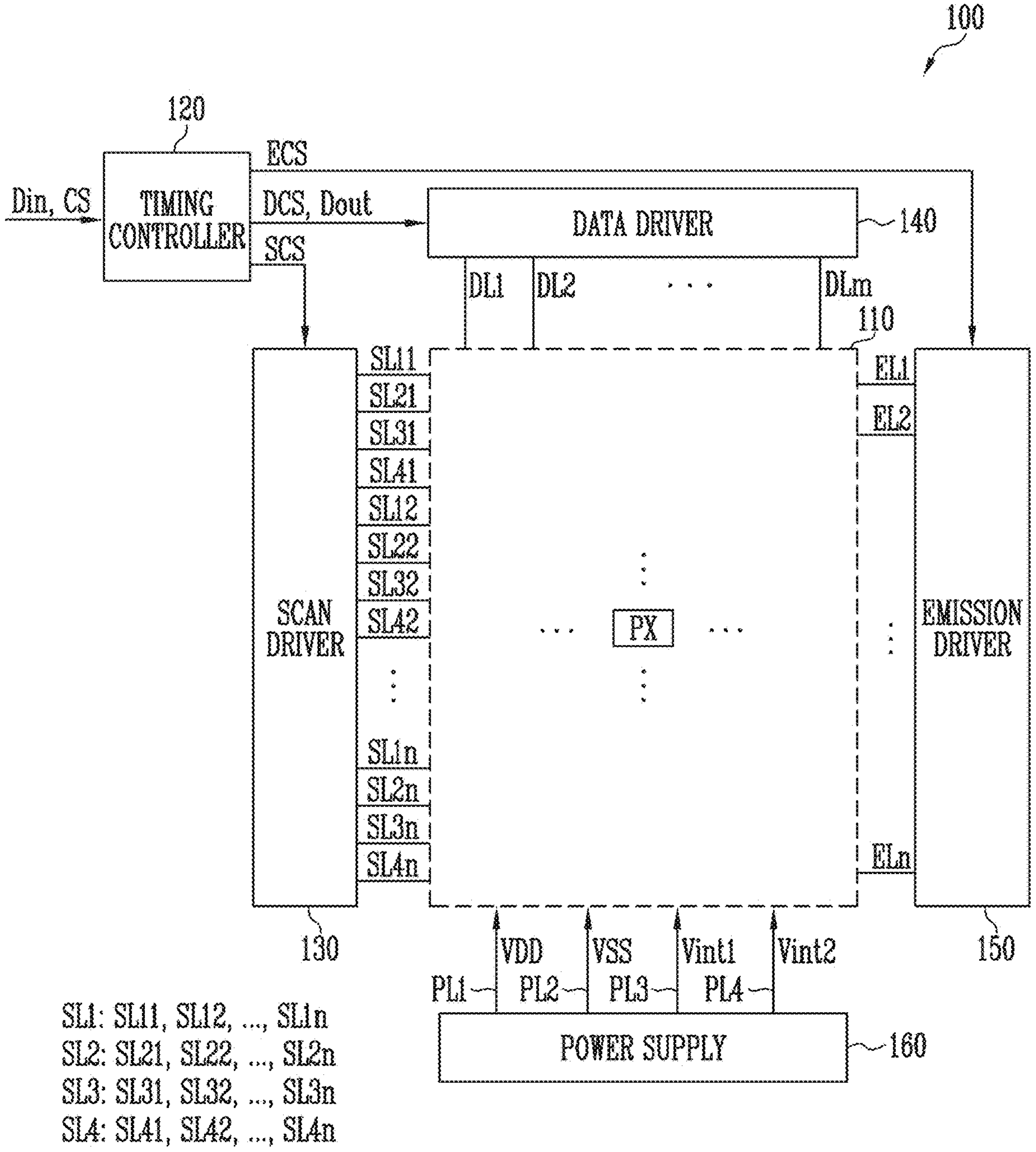
FIG. 1 is a diagram illustrating a display device according to some embodiments of the present disclosure.

Hereinafter, aspects of some embodiments are described in more detail with reference to the accompanying drawings to enable a person having ordinary skill in the art to make, use, and understand aspects of embodiments according to the present disclosure. The present disclosure may be implemented in various different forms and is not limited to the disclosed embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, embodiments according to the present disclosure are not limited to embodiments disclosed below, and may be implemented in various forms. Each of the embodiments disclosed below may be independently embodied or be combined with at least other embodiments prior to being embodied.

Figure 2:
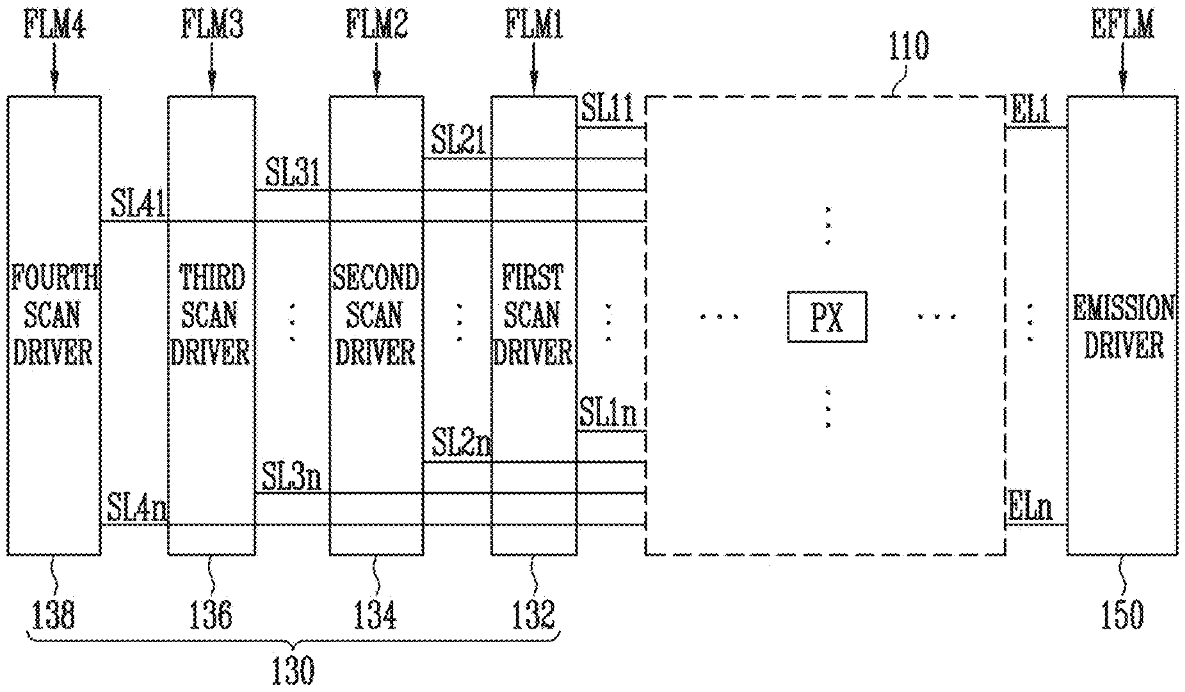
FIG. 2 is a diagram illustrating aspects of a scan driver and an emission driver, which are shown in FIG. 1 according to some embodiments.

FIG. 1 is a diagram illustrating a display device according to some embodiments of the present disclosure. FIG. 2 is a diagram illustrating aspects of a scan driver and an emission driver, which are shown in FIG. 1 according to some embodiments.

Referring to FIGS. 1 and 2, the display device 100 according to some embodiments of the present disclosure may include a display unit 110 (or display panel), a timing controller 120, a scan driver 130, a data driver 140, an emission driver 150, and a power supply 160.

The display device 100 may display images at various image refresh rates (or driving frequencies or screen refresh rates) according to driving conditions. The image refresh rate means a frequency at which a data signal is written to a driving transistor of a pixel PX. For example, the image refresh rate may also be referred to as a screen scan rate or a screen refresh frequency, and represent a frequency at which a display screen is reproduced for one second.

According to some embodiments, an output frequency of the data driver 140 and/or an output frequency of a first scan driver 132 which outputs a first scan signal (or write scan signal) with respect to one horizontal line (e.g., pixels PX connected to the same scan line may be sorted as one horizontal line (or pixel row)) may be determined corresponding to the image refresh rate. For example, an image refresh rate for driving a moving image may be a frequency of 60 Hz (or about 60 Hz) or higher (e.g., 120 Hz, 240 Hz, 360 Hz or the like).

For example, the display device 100 may display images, corresponding to various image refresh rates of 1 Hz to 360 Hz. However, this is merely illustrative, and the display device 100 may also display images at an image refresh rate of 360 Hz or higher (e.g., 480 Hz).

The display device 100 may divide the display unit 110 into a plurality of areas according to driving conditions, and display images at different image refresh rates with respect to the areas. To this end, the scan driver 130 may supply the first scan signal at different output frequencies with respect to the areas of the display unit 110. This will be described in more detail later with reference to FIGS. 11 and 12.

The display unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELn, and power lines PL1, PL2, PL3, and PL4 (n and m are natural numbers of 3 or more).

According to some embodiments, a pixel PXij (see FIG. 3) located on an ith horizontal line (or pixel row) and a jth vertical line (or pixel column) may be connected to an ith first scan line SL1*i*, an ith second scan line SL2*i*, an ith third scan line SL3*i*, an ith fourth scan line SL4*i*, an ith emission control line ELi, and a jth data line DLj (i is a natural number of n or less and j is a natural number of m or less.

Pixels PX may be selected in a horizontal line unit when an enable first scan signal is supplied to the first scan lines SL11 to SL1*n*. The pixels PX selected by the enable first scan signal may be supplied with a data signal from a data line (any one of DL1 to DLm) connected thereto. The pixel PX supplied with the data signal may generate light with a luminance (e.g., a set or predetermined luminance), corresponding to a voltage of the data signal.

The scan driver 130 may receive a scan driving signal SCS from the timing controller 120. At least one scan start signal and clock signals, which utilized for driving of the scan driver 130, may be included in the scan driving signal SCS. The scan driver 130 may generate the enable first scan signal, an enable second scan signal, an enable third scan signal, and an enable fourth scan signal while shifting the scan start signal, corresponding to a clock signal.

To this end, the scan driver 130 may include the first scan driver 132, a second scan driver 134, a third scan driver 136, and a fourth scan driver 138 as shown in FIG. 2. At least some of the scan drivers 132, 134, 136, and 138 may be integrated into one driving circuit, one module, or the like according to a design.

The first scan driver 132 may receive a first scan start signal FLM1, and generate the enable first scan signal while shifting the first scan start signal FLM1, corresponding to a clock signal. The first scan driver 132 may sequentially supply the enable first scan signal to the first scan lines SL11 to SL1*n*.

The second scan driver 134 may receive a second scan start signal FLM2, and generate the enable second scan signal while shifting the second scan start signal FLM2, corresponding to a clock signal. The second scan driver 134 may sequentially supply the enable second scan signal to second scan lines SL21 to SL2*n*.

The third scan driver 136 may receive a third scan start signal FLM3, and generate the enable third scan signal while shifting the third scan start signal FLM3, corresponding to a clock signal. The third scan driver 136 may sequentially supply the enable third scan signal to third scan lines SL31 to SL3*n*.

The fourth scan driver 138 may receive a fourth scan start signal FLM4, and generate the enable fourth scan signal while shifting the fourth scan start signal FLM4, corresponding to a clock signal. The fourth scan driver 138 may sequentially supply the enable fourth scan signal to fourth scan lines SL41 to SL4*n*.

Figure 3:
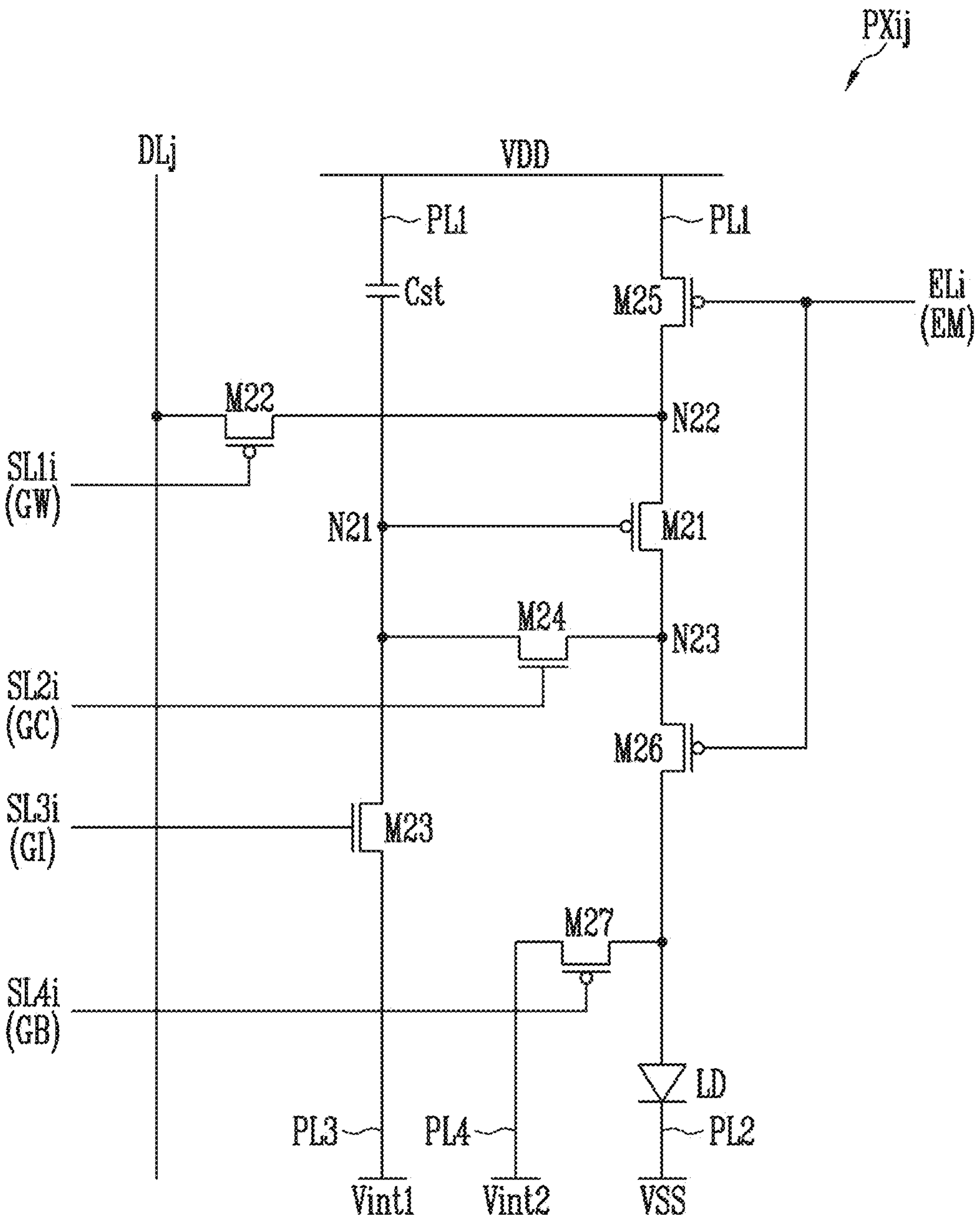
FIG. 3 is a diagram illustrating aspects of a pixel shown in FIG. 1 according to some embodiments.

Each of the enable first scan signal, the enable second scan signal, the enable third scan signal, and the enable fourth scan signal may be set to a gate-on voltage such that transistors included in the pixels PX can be turned on. According to some embodiments, each of an enable first scan signal GW and an enable fourth scan signal GB, which are supplied to P-type transistors as shown in FIG. 3, may be set to a logic low level voltage. According to some embodiments, each of an enable second scan signal GC and an enable third scan signal GI, which are supplied to N-type transistors as shown in FIG. 3, may be set to a logic high level voltage.

In FIG. 2, it is illustrated that the first scan driver 132, the second scan driver 134, the third scan driver 136, and the fourth scan driver 138 are connected to a first scan line SL1, a second scan line SL2, a third scan line SL3, and a fourth scan line SL4, respectively. However, the embodiments of the present disclosure are not limited thereto. According to some embodiments, at least two scan lines among the first scan line SL1, the second scan line SL2, the third scan line SL3, and the fourth scan line SL4 (i.e., at least two of SL1, SL2, SL3, and SL4) may be driven by one scan driver.

The data driver 140 may receive output data Dout and a data driving signal DCS from the timing controller 120. The data driving signal DCS may include a sampling signal and/or timing signals, necessary for driving of the data driver 140. The data driver 140 may generate a data signal, based on the data driving signal DCS and the output data Dout. According to some embodiments, the data driver 140 may generate an analog data signal, based on a grayscale of the output data Dout. The data driver 140 may supply the data signal in one horizontal period unit.

The emission driver 150 may receive an emission driving signal ECS from the timing controller 120. An emission start signal and clock signals, which are necessary for driving the emission driver 150, may be included in the emission driving signal ECS. The emission driver 150 may generate a disable emission control signal while shifting the emission start signal, corresponding to a clock signal.

As shown in FIG. 2, the emission driver 150 may receive an emission start signal EFLM, and generate a disable emission control signal by shifting the emission start signal EFLM, corresponding to a clock signal. The emission driver 150 may sequentially supply the disable emission control signal to the emission control lines EL1 to ELn. The disable emission control signal may be set to a gate-off voltage such that the transistors included in the pixels PX can be turned off. According to some embodiments, as shown in FIG. 3, a disable emission control signal EM supplied to a P-type transistor may be set to a logic high level voltage.

The timing controller 120 may receive input data Din and a control signal CS from a host system through an interface. According to some embodiments, the timing controller 120 may receive the input data Din and the control signal CS from at least one of a Graphics Processing Unit (GPU), a Central Processing Unit (CPU), or an Application Processor (AP), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140. According to some embodiments, the timing controller 120 may correct the input data Din, corresponding to an optical measurement result measured in a processing process.

The power supply 160 may generate various power sources necessary for driving of the display device 100. According to some embodiments, the power supply 160 may generate a first driving power source VDD, a second driving power source VSS, a first initialization power source Vint1, and a second initialization power source Vint2.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX are set to be in an emission state.

The first initialization power source Vint1 may be a power source for initializing a gate electrode of a driving transistor included in each of the pixels PX. The first initialization power source Vint1 may be set to a voltage lower than the data signal. The second initialization power source Vint2 may be a power source for initializing a first electrode (or anode electrode) of a light emitting element LD (see FIG. 3) included in each of the pixels PX. The second initialization power source Vint2 may be set to a voltage at which the light emitting element LD is turned off.

The first driving power source VDD generated by the power supply 160 may be supplied to a first power line PL1, the second driving power source VSS generated by the power supply 160 may be supplied to a second power line PL2, the first initialization power source Vint1 generated by the power supply 160 may be supplied to a third power line PL3, and the second initialization power source Vint2 generated by the power supply 160 may be supplied to a fourth power line PL4. The first power line PL1, the second power line PL2, the third power line PL3, and the fourth power line PL4 may be commonly connected to the pixels PX, but the embodiments of the present disclosure are not limited thereto.

According to some embodiments, the first power line PL1 may be configured with a plurality of power lines, and the plurality of power lines may be connected to different pixels PX. According to some embodiments, the second power line PL2 may be configured with a plurality of power lines, and the plurality of power lines may be connected to different pixels PX. According to some embodiments, the third power line PL3 may be configured with a plurality of power lines, and the plurality of power lines may be connected to different pixels PX. According to some embodiments, the fourth power line PL4 may be configured with a plurality of power lines, and the plurality of power lines may be connected to different pixels PX. That is, according to some embodiments of the present disclosure, each of the pixels PX may be connected to any one of the plurality of power lines constituting the first power line PL1, any one of the plurality of power lines constituting the second power line PL2, any one of the plurality of power lines constituting the third power line PL3, and any one of the plurality of power lines constituting the fourth power line PL4.

According to some embodiments of the present disclosure, the display device 100 may include a flat display device, a curved display device in which a portion of the display unit 110 is curved, a flexible display device in which a portion of the display unit 110 is folded or bent, and a stretchable display device in which a portion of the display unit 110 is expanded/contracted.

According to some embodiments of the present disclosure, the display device is a device which displays moving images (e.g., video images) or still images (e.g., static images), and may include portable electronic devices such as a mobile phone, a smartphone, a tablet personal computer (PC), a smart watch, a watch phone, a portable multimedia player (PMP), a navigation system, and an ultra mobile computer (UMPC). According to some embodiments of the present disclosure, the display device 100 may include electronic devices such as a television, a notebook computer, a monitor, an advertisement board, and Internet of things (IOT).

FIG. 3 is a diagram illustrating aspects of the pixel shown in FIG. 1 according to some embodiments. Although FIG. 3 illustrates various components that may be included in a pixel, embodiments according to the present disclosure are not limited thereto, and according to some embodiments, the pixel may include additional components or fewer components without departing from the spirit and scope of embodiments according to the present disclosure. In FIG. 3, a pixel PXij located on an ith horizontal line and a jth vertical line will be illustrated.

Referring to FIG. 3, the pixel PXij according to some embodiments of the present disclosure may be connected to corresponding signal lines SL1*i*, SL2*i*, SL3*i*, SL4*i*, ELi, and DLj. According to some embodiments, the pixel PXij may be connected to an ith first scan line SL1*i*, an ith second scan line SL2*i*, an ith third scan line SL3*i*, an ith fourth scan line SL4*i*, an ith emission control line ELi, and a jth data line DLj. According to some embodiments, the pixel PXij may further connected to the first power line PL1, the second power line PL2, the third power line PL3, and the fourth power line PL4.

The pixel PXij according to some embodiments of the present disclosure may include a light emitting element LD and a pixel circuit for controlling an amount of current supplied to the light emitting element LD.

The light emitting element LD may be connected between the first power line PL1 and the second power line PL2. According to some embodiments, a first electrode (or anode electrode) of the light emitting element LD may be electrically connected to the first power line PL1 via a sixth transistor M26, a third node N23, a first transistor M21, a second node N22, and a fifth transistor M25, and a second electrode (or cathode electrode) of the light emitting element LD may be electrically connected to the second power line PL2. The light emitting element LD may generate light with a predetermined luminance, corresponding to an amount of current supplied from the first power line PL1 to the second power PL2 via the pixel circuit.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 3, it is illustrated that the pixel PXij includes a single light emitting element LD. However, according to some embodiments, the pixel PXij may include a plurality of light emitting elements LD, and the plurality of light emitting elements LD may be connected in series, parallel or series/parallel to each other.

The pixel circuit may include the first transistor M21, a second transistor M22, a third transistor M23, a fourth transistor M24, the fifth transistor M25, the sixth transistor M26, a seventh transistor M27, and a storage capacitor Cst.

A first electrode of the first transistor M21 (or driving transistor) may be connected to the second node N22, and a second electrode of the first transistor M21 may be connected to the third node N23. In addition, a gate electrode of the first transistor M21 may be connected to a first node N21. The first transistor M21 may control an amount of current supplied from the first driving power source VDD to the second driving power source VSS via the light emitting element LD, corresponding to a voltage of the first node N21.

The second transistor M22 may be connected between the data line DLj and the second node N22. In addition, a gate electrode of the second transistor M22 may be electrically connected to the first scan line SL1*i*. The second transistor M22 may be turned on when an enable first scan signal GW is supplied to the first scan line SL1*i*, to electrically connect the data line DLj and the second node N22 to each other.

A first electrode of the third transistor M23 may be connected to the first node N21, and a second electrode of the third transistor M23 may be electrically connected to the third power line PL3. In addition, a gate electrode of the third transistor M23 may be electrically connected to the third scan line SL3*i*. The third transistor M23 may be turned on when an enable third scan signal GI is supplied to the third scan line SL3*i*, to supply the voltage of the first initialization power source Vint1 to the first node N21.

The fourth transistor M24 may be connected between the first node N21 and the third node N23. In addition, a gate electrode of the fourth transistor M24 may be electrically connected to the second scan line SL2*i*. The fourth transistor M24 may be turned on when an enable second scan signal GC is supplied to the second scan line SL2*i*, to electrically connect the first node N21 and the third node N23 to each other. That is, when the fourth transistor M24 is turned on, the first transistor M21 may be diode-connected.

A first electrode of the fifth transistor M25 may be electrically connected to the first power line PL1, and a second electrode of the fifth transistor M25 may be connected to the second node N22. In addition, a gate electrode of the fifth transistor M25 may be electrically connected to an emission control line ELi. The fifth transistor M25 may be turned off when a disable emission control signal EM is supplied to the emission control line ELi, and be turned on when an enable emission control signal EM is supplied to the emission control line ELi.

The sixth transistor M26 may be connected between the third node N23 and the first electrode of the light emitting element LD. In addition, a gate electrode of the sixth transistor M26 may be electrically connected to the emission control line ELi. The sixth transistor M26 may be turned off when the disable emission control signal EM is supplied to the emission control line ELi, and be turned on when the enable emission control signal EM is supplied to the emission control line ELi.

A first electrode of the seventh transistor M27 may be connected to the first electrode of the light emitting element LD, and a second electrode of the seventh transistor M27 may be electrically connected to the fourth power line PL4. In addition, a gate electrode of the seventh transistor M27 may be electrically connected to the fourth scan line SL4*i*. The seventh transistor M27 may be turned on when an enable fourth scan signal GB is supplied to the fourth scan line SL4*i*, to supply the voltage of the second initialization power source Vint2 to the first electrode of the light emitting element LD.

When the voltage of the second initialization power source Vint2 is supplied to the first electrode of the light emitting element LD, a parasitic capacitor of the light emitting element LD may be discharged. As a residual voltage charged in the parasitic capacitor of the light emitting element LD is discharged (or removed), unintended minute emission can be prevented. Thus, the black expression ability of the pixel PXij can be improved.

The storage capacitor Cst may be connected between the first power line PL1 and the first node N21. The storage capacitor Cst may store a voltage applied to the first node N21.

According to some embodiments, the first transistor M21, the second transistor M22, the fifth transistor M25, the sixth transistor M26, and the seventh transistor M27 may be implemented with a poly-silicon semiconductor transistor. According to some embodiments, the first transistor M21, the second transistor M22, the fifth transistor M25, the sixth transistor M26, and the seventh transistor M27 may include a poly-silicon semiconductor layer formed as an active layer (channel) through a low temperature poly-silicon (LTPS) process. In addition, the first transistor M21, the second transistor M22, the fifth transistor M25, the sixth transistor M26, and the seventh transistor M27 may be implemented with a P-type transistor (e.g., a PMOS transistor). Accordingly, a gate-on voltage at which the first transistor M21, the second transistor M22, the fifth transistor M25, the sixth transistor M26, and the seventh transistor M27 are turned on may have a logic low level. Because the poly-silicon semiconductor transistor may have a relatively high response speed, the poly-silicon semiconductor transistor may be applied to a switching element which requires fast switching.

According to some embodiments, the third transistor M23 and the fourth transistor M24 may be formed with an oxide semiconductor transistor. According to some embodiments, the third transistor M23 and the fourth transistor M24 may be implemented with an N-type oxide semiconductor transistor (e.g., an NMOS transistor), and include an oxide semiconductor layer as an active layer. Accordingly, a gate-on voltage at which the third transistor M23 and the fourth transistor M24 are turned on may have a logic high level.

The oxide semiconductor transistor can be formed through a low temperature process, and have a charge mobility lower than a charge mobility of the poly-silicon semiconductor transistor. That is, the oxide semiconductor transistor has an excellent off-current characteristic. Thus, when the third transistor M23 and the fourth transistor M24 are implemented with the oxide semiconductor transistor, leakage current according to low frequency driving can be minimized or reduced, and accordingly, display quality can be improved.

Figure 4:
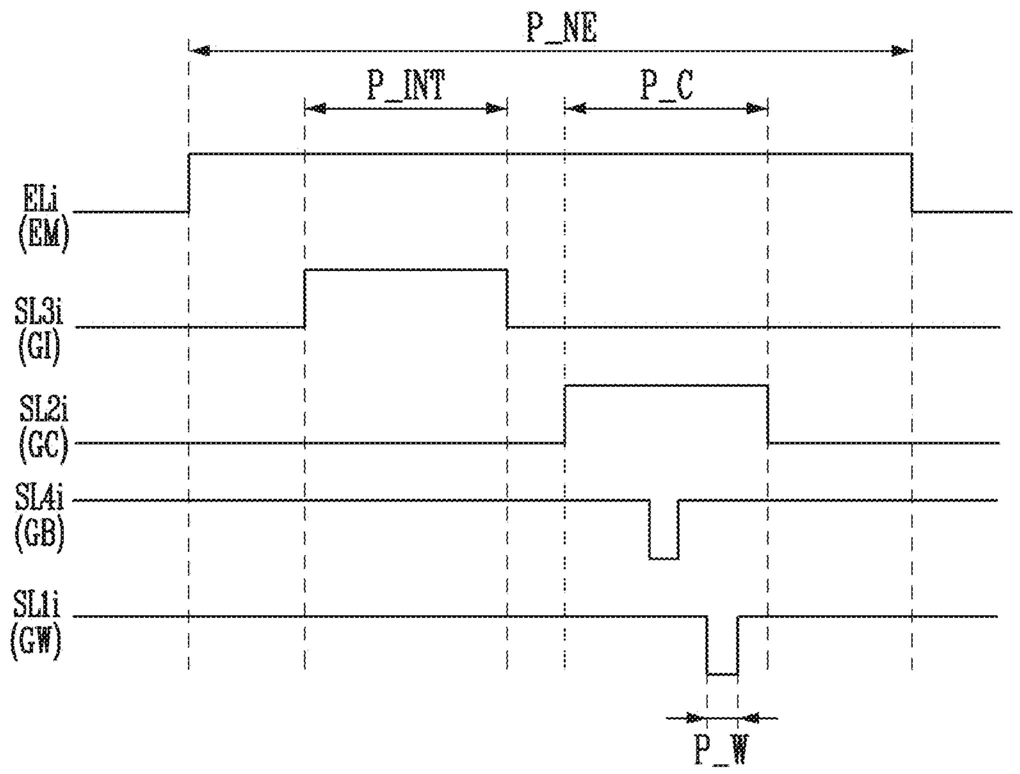
FIGS. 4 and 5 are waveform diagrams illustrating aspects of a driving method of the pixel shown in FIG. 3 according to some embodiments.
Figure 5:
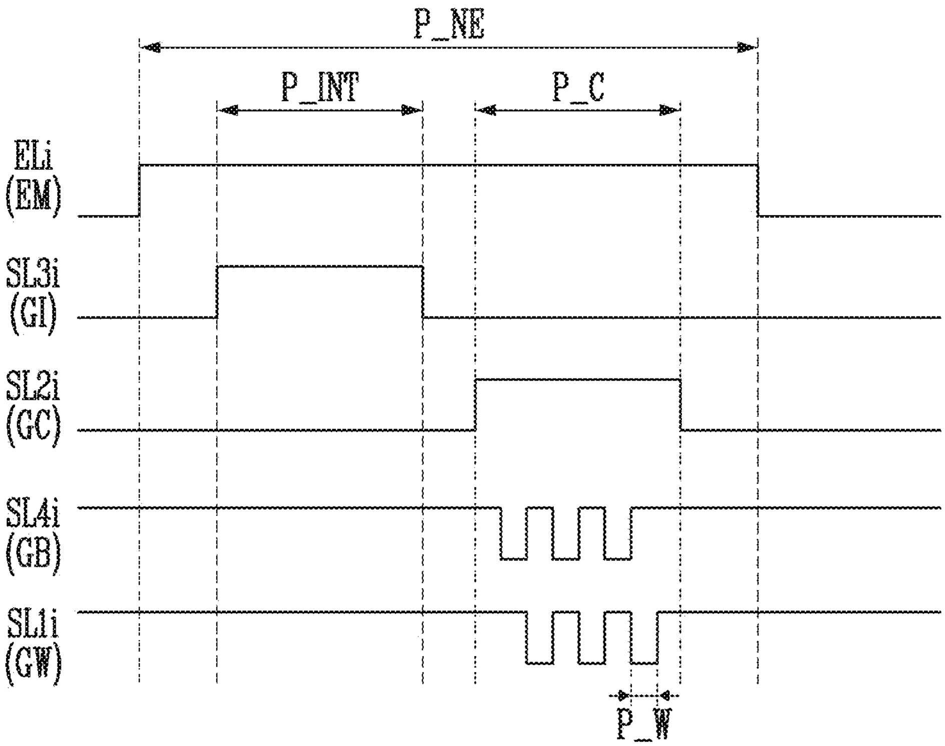

FIGS. 4 and 5 are waveform diagrams illustrating aspects of a driving method of the pixel shown in FIG. 3 according to some embodiments.

Referring to FIG. 4, one frame period may include a non-emission period P_NE, and the non-emission period P_NE may include an initialization period P_INT, a compensation period P_C, and a writing period P_W. The writing period P_W may be included in the compensation period P_C.

A disable emission control signal EM (or an emission control signal EM having a high level) may be supplied during the non-emission period P_NE. The fifth transistor M25 and the sixth transistor M26 may be turned off in response to the disable emission control signal EM, and the pixel PXij may not emit light.

An enable third scan signal GI may be supplied in the initialization period P_INT. When the enable third scan signal GI is supplied, the third transistor M23 may be turned on, the voltage of the first initialization power source Vint1 of the third power line PL3 may be provided to the first node N21.

An enable second scan signal GC may be supplied during the compensation period P_C. When the enable second scan signal GC is supplied, the fourth transistor M24 may be turned on, and the first transistor M21 may be diode-connected.

An enable first scan signal GW may be supplied in the writing period P_W. When the enable first scan signal GW is supplied, the second transistor M22 may be turned on, and a data signal may be provided from the jth data line DLj to the second node N22. Because the fourth transistor M24 is in a turn-on state by the enable second scan signal GC, the data signal may be transferred from the second node N22 to the first node N21 via the first transistor M21 and the fourth transistor M24. Because the diode-connection of the first transistor M21 is maintained by the turned-on fourth transistor M24, the first node N21 may have a voltage obtained by compensating for a threshold voltage of the first transistor M21 in the data signal.

Before the writing period P_W, an enable fourth scan signal GB may be supplied. When the enable fourth scan signal GB is supplied, the seventh transistor M27 may be turned on, and the voltage of the second initialization power source Vint2 may be supplied to the first electrode of the light emitting element LD.

After that, the non-emission period P_NE may be ended, and an enable emission control signal EM (or an emission control signal having a low level) may be supplied. When the enable emission control signal EM is supplied, the fifth transistor M25 and the sixth transistor M26 may be turned on. When the fifth transistor M25 and the sixth transistor M26 are turned on, a current flowing path may be formed up to the second power line PL2 through the fifth transistor M25, the first transistor M21, the sixth transistor M26, and the light emitting element LD. A driving current corresponding to the voltage of the first node N21 may flow through the light emitting element LD according to an operation of the first transistor M21, and the light emitting element LD may emit light with a luminance corresponding to the driving current.

Meanwhile, a plurality of enable first scan signals GW may be supplied during the compensation period P_C as shown in FIG. 5. A data signal supplied to the data lien DLj may be supplied to the second node N22, corresponding to the plurality of enable first scan signals GW. A data signal supplied to be synchronized with an enable first scan signal GW lastly supplied during the compensation period P_C may be finally stored in the storage capacitor Cst. That is, a period in which the enable first scan signal GW is lastly supplied may be the writing period P_W. Although the plurality of enable first scan signals GW are supplied, a voltage corresponding to a desired data signal may be stored in the storage capacitor Cst.

Meanwhile, a fourth scan signal GB may be a first scan signal GW supplied to a previous horizontal line (i.e., an (i−1)th horizontal line). A plurality of enable fourth scan signals GB may be supplied during the compensation period P_C. When the plurality of enable fourth scan signals GB are supplied, the seventh transistor M27 may supply the voltage of the second initialization power source Vint2 to the first electrode of the light emitting element LD while being turned on and turned off plural times.

Figure 6:
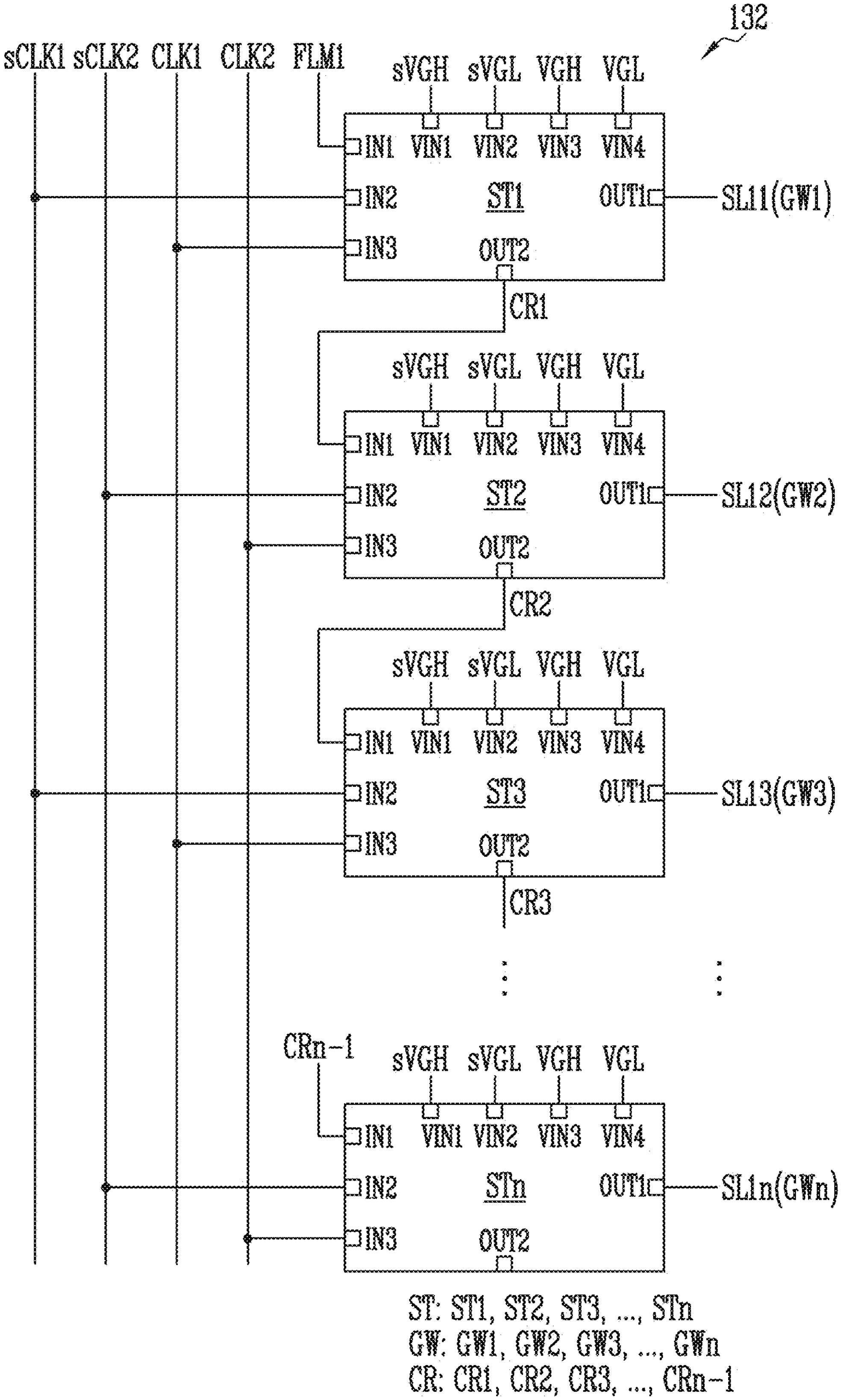
FIG. 6 is a diagram illustrating a stage circuit of the scan driver in according to some embodiments of the present disclosure.
Figure 7:
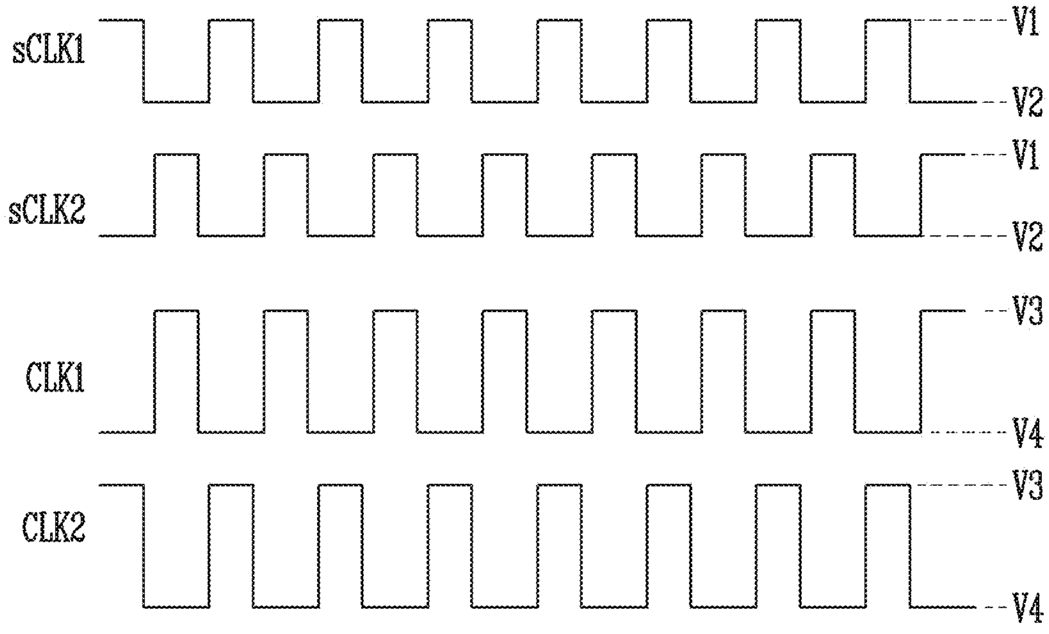
FIG. 7 is a diagram illustrating an auxiliary clock signal and a clock signal, which are shown in FIG. 6.

FIG. 6 is a diagram illustrating a stage circuit of the scan driver in according to some embodiments of the present disclosure. FIG. 7 is a diagram illustrating an auxiliary clock signal and a clock signal, which are shown in FIG. 6. In FIG. 6, the scan driver (e.g., the first scan driver 132) for supplying a first scan signal GW will be illustrated.

Referring to FIG. 6, the first scan driver 132 may include a plurality of stage circuits ST1, ST2, ST3, . . . , and STn. Each of the stage circuits ST1 to STn may be electrically connected to any one of first scan lines SL11, SL12, SL13, . . . , and SL1*n*.

According to some embodiments, a first stage circuit ST1 may be electrically connected to a first scan line SL11, and supply an enable first scan signal GW1 to the first scan line SL11. A second stage circuit ST2 may be electrically connected to a first scan line SL12, and supply an enable first scan signal GW2 to the first scan line SL12. A third stage circuit ST3 may be electrically connected to a first scan line SL13, and supply an enable first scan signal GW3 to the first scan line SL13. An nth stage circuit STn may be electrically connected to a first scan line SL1*n*, and supply an enable first scan signal GWn to the first scan line SL1*n*.

Each of the stage circuits ST1 to STn may include a first input terminal IN1, a second input terminal IN2, a third input terminal IN3, a first power input terminal VIN1 (or first auxiliary power input terminal), a second power input terminal VIN2 (or second auxiliary power input terminal), a third power input terminal VIN3 (or first main power input terminal), a fourth power input terminal VIN4 (or second main power input terminal), a first output terminal OUT1, and a second output terminal OUT2.

A first scan start signal FLM1 or a carry signal CR of a previous stage circuit may be input to the first input terminal IN1. According to some embodiments, the first scan start signal FLM1 may be input to a first input terminal IN1 of the first stage circuit ST1. According to some embodiments, a carry signal CR of a previous stage circuit may be input to a first input terminal IN1 of each of the second stage circuit ST2 to the nth stage circuit STn. According to some embodiments, a first carry signal CR1 output from the first stage circuit ST1 may be input to a first input terminal IN1 of the second stage circuit ST2.

An auxiliary first clock signal sCLK1 or an auxiliary second clock signal sCLK2 may be input to the second input terminal IN2. According to some embodiments, the auxiliary first clock signal sCLK1 may be input to a second input terminal IN2 of each of kth (k is an odd number) stage circuits ST1, ST3, . . . , According to some embodiments, the auxiliary second clock signal sCLK2 may be input to a second input terminal IN2 of each of (k+1)th (i.e., even-numbered) stage circuits ST2, . . . , and STn.

The auxiliary first clock signal sCLK1 and the auxiliary second clock signal sCLK2 may be signals which have the same cycle and different phases as shown in FIG. 7. According to some embodiments, the auxiliary first clock signal sCLK1 and the auxiliary second clock signal sCLK2 may have phases different from each other by 180 degrees. A high voltage of the auxiliary first clock signal sCLK1 and the auxiliary second clock signal sCLK2 may be set as a first voltage V1, and a low voltage of the auxiliary first clock signal sCLK1 and the auxiliary second clock signal sCLK2 may be set as a second voltage V2.

A first clock signal CLK1 or a second clock signal CLK2 may be input to the third input terminal IN3. According to some embodiments, the first clock signal CLK1 may be input to a third input terminal IN3 of each of the kth stage circuits ST1, ST3, . . . . According to some embodiments, the second clock signal CLK2 may be input to a third input terminal IN3 of each of the (k+1)th stage circuits ST2, . . . , and STn.

The first clock signal CLK1 and the second clock signal CLK2 may be signals which have the same cycle and different phases as shown in FIG. 7. According to some embodiments, the first clock signal CLK1 and the second clock signal CLK2 may have phases different from each other by 180 degrees. A high voltage of the first clock signal CLK1 and the second clock signal CLK2 may be set as a third voltage V3, and a low voltage of the first clock signal CLK1 and the second clock signal CLK2 may be set as a fourth voltage V4.

According to some embodiments, the third voltage V3 may be a voltage higher than the first voltage V1. According to some embodiments, the fourth voltage V4 may be a voltage lower than the second voltage V2. A voltage swing range of the clock signals CLK1 and CLK2 may be set larger than a voltage swing range of the auxiliary clock signals sCLK1 and sCLK2. According to some embodiments, the auxiliary clock signals sCLK1 and sCLK2 may have a voltage swing range of −3V to 3V, and the clock signals CLK1 and CLK2 may have a voltage swing range of −7V to 7V.

As described above, the first clock signal CLK1 may have a voltage swing range different from a voltage swing range of the auxiliary first clock signal sCLK1. Also, the first clock signal CLK1 may have the same cycle as the auxiliary first clock signal sCLK1 and have a phase different from a phase of the auxiliary first clock signal sCLK1. According to some embodiments, the first clock signal CLK1 and the auxiliary first clock signal sCLK1 may have phases different from each other by 180 degrees.

As described above, the second clock signal CLK2 may have a voltage swing range different from a voltage swing range of the auxiliary second clock signal sCLK2. Also, the second clock signal CLK2 may have the same cycle as the auxiliary second clock signal sCLK2 and have a phase different from a phase of the auxiliary second clock signal sCLK2. According to some embodiments, the second clock signal CLK2 and the auxiliary second clock signal sCLK2 may have phases different from each other by 180 degrees.

An auxiliary first power source sVGH may be input to the first power input terminal VIN1, and an auxiliary second power source sVGL may be input to the second power input terminal VIN2. The auxiliary first power source sVGH may be set to a high voltage, e.g., the first voltage V1. The auxiliary second power source sVGL may be set to a low voltage, e.g., the second voltage V2.

A first power source VGH may be input to the third power input terminal VIN3, and a second power source VGL may be input to the fourth power input terminal VIN4. The first power source VGH may be set to a high voltage, e.g., the third voltage V3. The second power source VGL may be set to a low voltage, e.g., the fourth voltage V4.

A first scan signal GW may be output to the first output terminal OUT1. An enable first scan signal GW (i.e., a low voltage) may be set to the fourth voltage V4, and a disable first scan signal GW (i.e., a high voltage) may be set to the third voltage V3.

A carry signal CR may be output to the second output terminal OUT2. A low voltage of the carry signal CR may be set as the second voltage V2, and a high voltage of the carry signals CR may be set as the first voltage V1.

The stage circuit ST according to some embodiments of the present disclosure may generate an internal signal (i.e., the carry signal CR), using the auxiliary clock signals sCLK1 and sCLK2, the auxiliary first power source sVGH, and the auxiliary second power source sVGL, which have relatively low voltages. Power consumption for generating the carry signal CR can be reduced.

The stage circuit ST according to some embodiments of the present disclosure may generate an external signal (i.e., the first scan signal GW) for driving the pixels PX, using the clock signals CLK1 and CLK2, the first power source VGH, and the second power source VGH, which have relatively high voltages. The pixels PX can be stably driven.

Figure 8A:
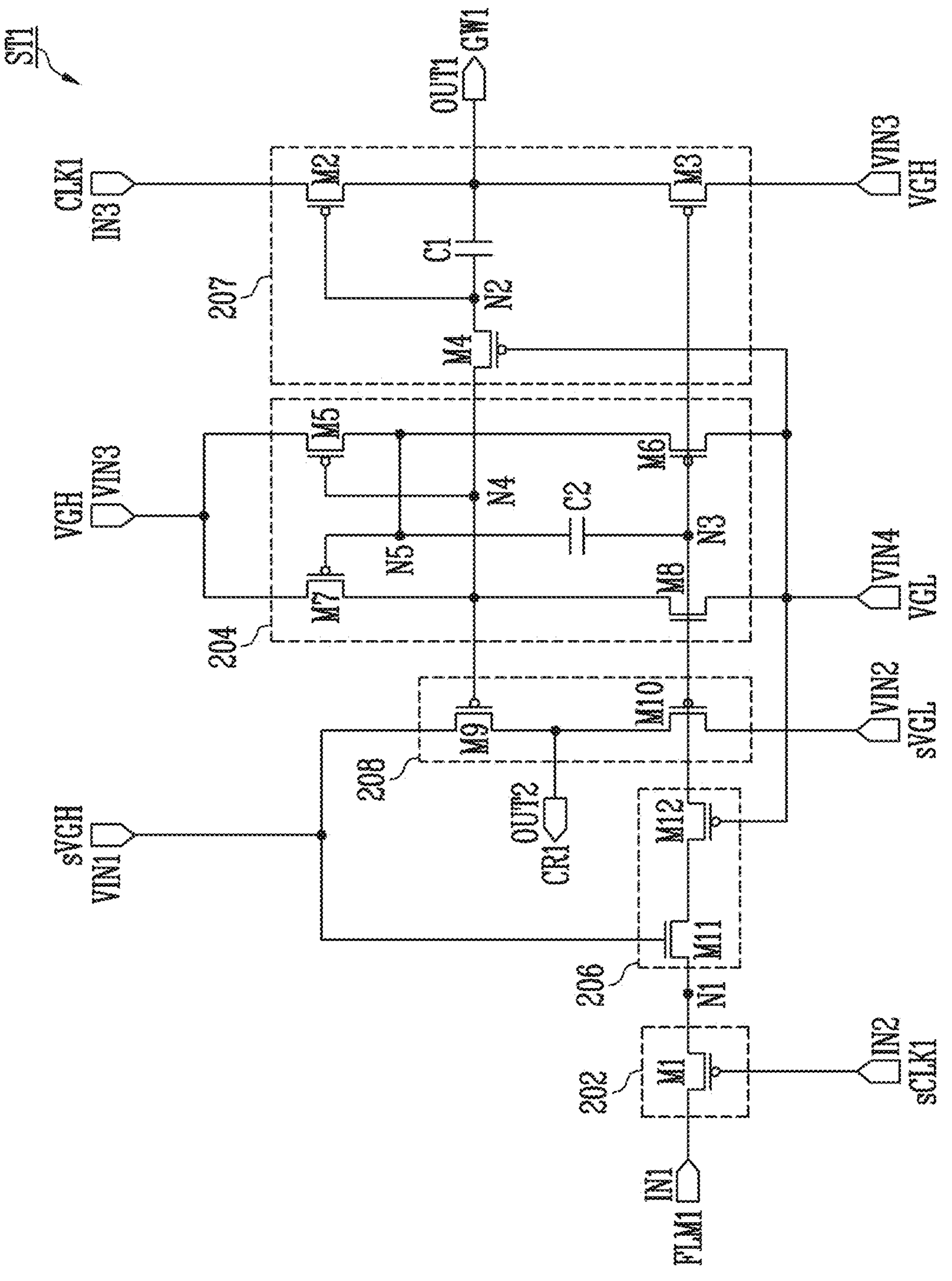
FIGS. 8A and 8B are circuit diagrams illustrating aspects of the stage circuit shown in FIG. 6 according to some embodiments.
Figure 8B:
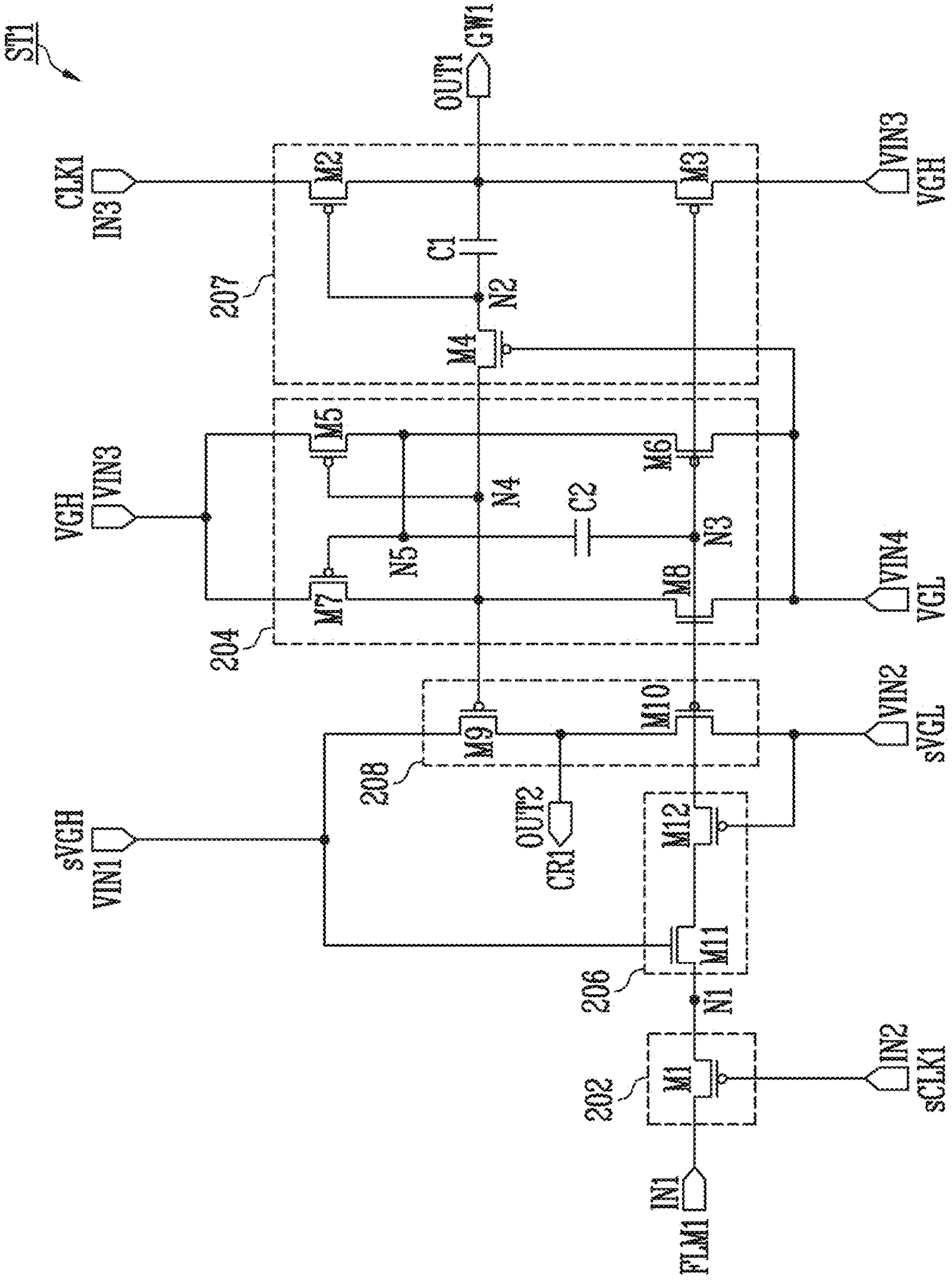

FIGS. 8A and 8B are circuit diagrams illustrating aspects of the stage circuit shown in FIG. 6. In FIGS. 8A and 8B, for convenience of description, the first stage circuit ST1 will be illustrated.

Referring to FIG. 8A, the first stage circuit ST1 according to some embodiments of the present disclosure may include an input unit 201, a first voltage controller 204, a first output unit 207, a second output unit 208, and a second voltage controller 206.

The input unit 202 may be located between a first input terminal IN1 and a first node N1, and control an electrical connection between the first input terminal IN1 and the first node N1, corresponding to the auxiliary first clock signal sCLK1 input to a second input terminal IN2. To this end, the input unit 202 may include a first transistor M1.

The first transistor M1 may be connected between the first input terminal IN1 and the first node N1, and a gate electrode of the first transistor M1 may be connected to the second input terminal IN2. The first transistor M1 may be turned on when the auxiliary first click signal sCLK1 having a low level is input to the second input terminal IN2, to electrically connect the first input terminal IN1 and the first node N1 to each other.

The second voltage controller 206 may be located between the first node N1 and a third node N3, and control a voltage of the third node N3 to be maintained as a voltage higher or lower than a voltage of the first node N1. To this end, the second voltage controller 206 may include an eleventh transistor M11 (or first voltage control transistor) and a twelfth transistor M12 (or second voltage control transistor).

The eleventh transistor M11 and the twelfth transistor M12 may be connected in series between the first node N1 and the third node N3. The eleventh transistor M11 may be set as an N-type transistor, and a gate electrode of the eleventh transistor M11 may be connected to a first power input terminal VIN1. The twelfth transistor M12 may be set as a P-type transistor, and a gate electrode of the twelfth transistor M12 may be connected to a fourth power input terminal VIN4.

The eleventh transistor M11 may be turned off when the voltage of the third node N3 is set as a voltage higher than the voltage of the auxiliary first power source sVGH, and maintain a turn-on state in other cases. The voltage of the third node N3 may be set as a voltage higher than the voltage of the first node N1 by the eleventh transistor M11.

The twelfth transistor M12 may be turned off when the voltage of the third node N3 is set as a voltage lower than the voltage of the second power source VGL. Then, the voltage of the third node N3 may be decreased to a voltage lower than the voltage of the second power source VGL. The voltage of the third node N3 may be set as a voltage lower than the voltage of the first node N1.

Additionally, the gate electrode of the twelfth transistor M12 may be connected to a second power input terminal VIN2 as shown in FIG. 8B. The twelfth transistor M12 may be turned off when the voltage of the third node N3 is set as a voltage lower than the voltage of the auxiliary second power source sVGL.

The first voltage controller 204 may control a voltage of each of a second node N2 (and the fourth node N4) and the third node N3 as a voltage higher or lower than the voltage of the first node N1, corresponding to the voltage of the first node N1. To this end, the first voltage controller 204 may include a fifth transistor M5, a sixth transistor M6, a seventh transistor M7, an eighth transistor M8, and a second capacitor C2.

The fifth transistor M5 (or first control transistor) may be connected between a third power input terminal VIN3 and a fifth node N5. In addition, a gate electrode of the fifth transistor M5 may be connected to a fourth node N4. The fifth transistor M5 may control an electrical connection between the third power input terminal VIN3 and the fifth node N5 while being turned on or turned off corresponding to a voltage of the fourth node N4.

The sixth transistor M6 (or second control transistor) may be connected between the fifth node N5 and the fourth power input terminal VIN4. In addition, a gate electrode of the sixth transistor M6 may be connected to the third node N3. The sixth transistor M6 may control an electrical connection between the fifth node N5 and the fourth power input terminal VIN4 while being turned on or turned off corresponding to a voltage of the third node N3.

The seventh transistor M7 (or third control transistor) may be connected between the third power input terminal VIN3 and the fourth node N4. In addition, a gate electrode of the seventh transistor M7 may be connected to the fifth node N5. The seventh transistor M7 may control an electrical connection between the third power input terminal VIN3 and the fourth node N4 while being turned on or turned off corresponding to a voltage of the fifth node N5.

The eighth transistor M8 (or fourth control transistor) may be connected between the fourth node N4 and the fourth power input terminal VIN4. In addition, a gate electrode of the eighth transistor M8 may be connected to the third node N3. The eighth transistor M8 may control an electrical connection between the fourth node N4 and the fourth power input terminal VIN4 while being turned on or turned off corresponding to the voltage of the third node N3.

The second capacitor C2 may be connected between the fifth node N5 and the third node N3. The second capacitor C2 may be driven as a coupling capacitor, and control the voltage of the third node N3, corresponding to a voltage variation of the fourth node N4.

The first output unit 207 may output a first scan signal GW1 to a first output terminal OUT1. To this end, the first output unit 207 may include a second transistor M2, a third transistor M3, a fourth transistor M4, and a first capacitor C1.

The second transistor M2 (or first scan output transistor) may be connected between a third input terminal IN3 and the first output terminal OUT1. In addition, a gate electrode of the second transistor M2 may be connected to the second node N2. The second transistor M2 may control an electrical connection between the third input terminal IN3 and the first output terminal OUT1 while being turned on or turned off corresponding to a voltage of the second node N2.

The third transistor M3 (or second scan output transistor) may be connected between the first output terminal OUT1 and the third power input terminal VIN3. In addition, a gate electrode of the third transistor M3 may be connected to the third node N3. The third transistor M3 may control an electrical connection between the third power input terminal VIN3 and the first output terminal OUT1 while being turned on or turned off corresponding to the voltage of the third node N3.

The fourth transistor M4 (or control transistor) may be connected between the fourth node N4 and the second node N2. In addition, a gate electrode of the fourth transistor M4 may be connected to the fourth power input terminal VIN4.

The fourth transistor M4 may be turned off when the voltage of the second node N2 is set as a voltage lower than the voltage of the second power source VGL. Then, the voltage of the second node N2 may be decreased as a voltage lower than the voltage of the fourth node N4.

The first capacitor C1 may be connected between the second node N2 and the first output terminal OUT1. The first capacitor C1 may control the voltage of the second node N2, corresponding to a voltage of the first output terminal OUT1, such that the second transistor M2 stably maintains a turn-on state.

The second output unit 208 may output the first carry signal CR1 to a second output terminal OUT2, corresponding to the voltage of each of the third node N3 and the fourth node N4. To this end, the second output unit 208 may include a ninth transistor M9 and a tenth transistor M10.

The ninth transistor M9 (or first carry output transistor) may be connected between the first power input terminal VIN1 and the second output terminal OUT2. In addition, a gate electrode of the ninth transistor M9 may be connected to the fourth node N4. The ninth transistor M9 may control an electrical connection between the first power input terminal VIN1 and the second output terminal OUT2 while being turned on or turned off corresponding to the voltage of the fourth node N4.

The tenth transistor M10 (or second carry output transistor) may be connected between the second output terminal OUT2 and the second power input terminal VIN2. In addition, a gate electrode of the tenth transistor M10 may be connected to the third node N3. The tenth transistor M10 may control an electrical connection between the second output terminal OUT2 and the second power input terminal VIN2 while being turned on or turned off corresponding to the voltage of the third node N3.

According to some embodiments, the first transistor M1, the second transistor M2, the third transistor M3, the fourth transistor M4, the fifth transistor M5, the sixth transistor M6, the seventh transistor M7, the ninth transistor M9, the tenth transistor M10, and the twelfth transistor M12 may include a poly-silicon semiconductor layer formed as an active layer (channel) through a low temperature poly-silicon (LTPS) process. In addition, the first transistor M1, the second transistor M2, the third transistor M3, the fourth transistor M4, the fifth transistor M5, the sixth transistor M6, the seventh transistor M7, the ninth transistor M9, the tenth transistor M10, and the twelfth transistor M12 may be implemented with a P-type transistor (e.g., a PMOS transistor). Accordingly, a gate-on voltage at which the first transistor M1, the second transistor M2, the third transistor M3, the fourth transistor M4, the fifth transistor M5, the sixth transistor M6, the seventh transistor M7, the ninth transistor M9, the tenth transistor M10, and the twelfth transistor M12 are turned on may have a logic low level.

According to some embodiments, the eighth transistor M8 and the eleventh transistor M11 may be implemented with an N-type oxide semiconductor transistor (e.g., an NMOS transistor), and include an oxide semiconductor layer as an active layer. Accordingly, a gate-on voltage at which the eighth transistor M8 and the eleventh transistor M11 are turned on may have a logic high level.

Figure 9:
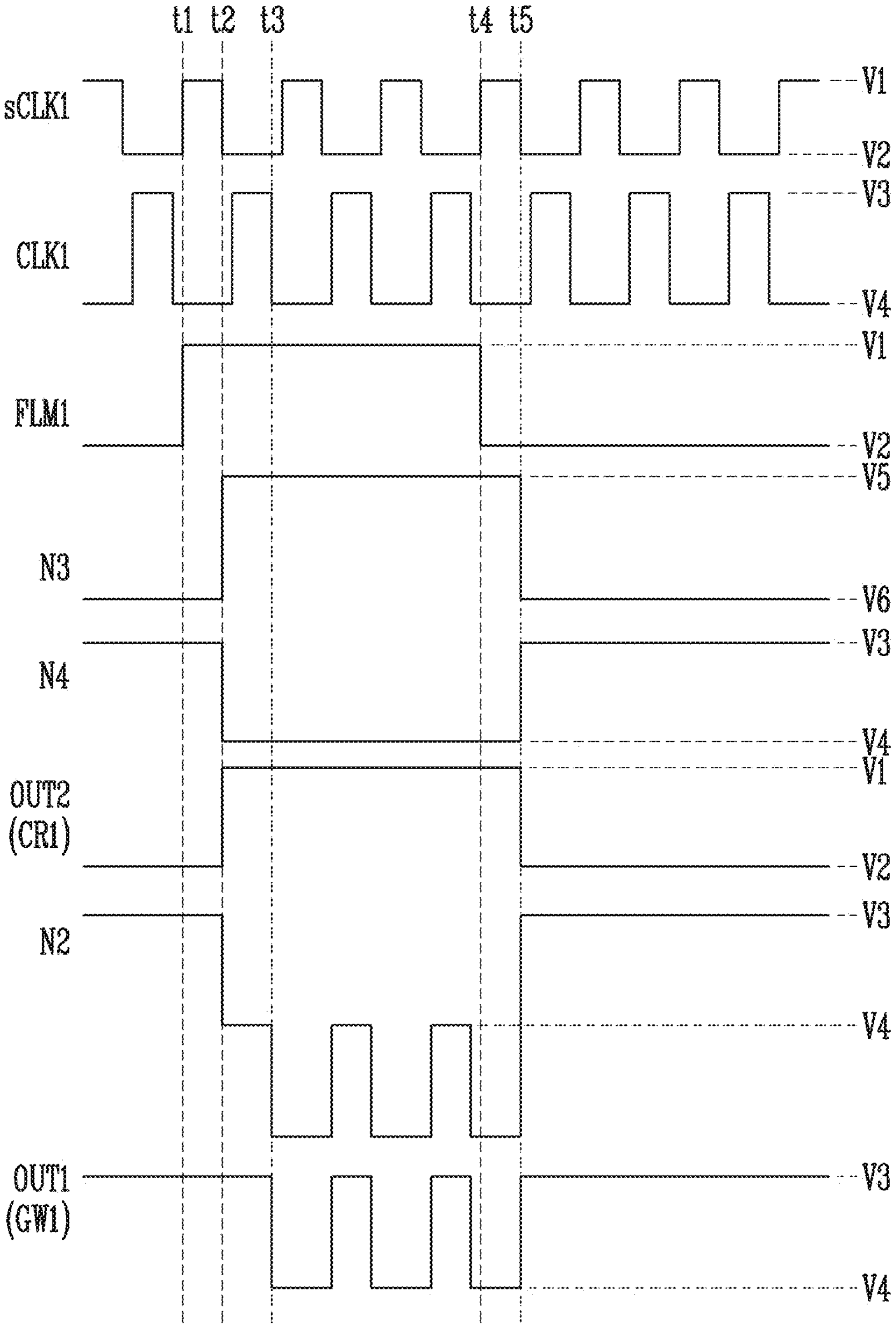
FIGS. 9 and 10 are waveform diagrams illustrating aspects of a driving method of the stage circuit shown in FIGS. 8A and 8B according to some embodiments.
Figure 10:
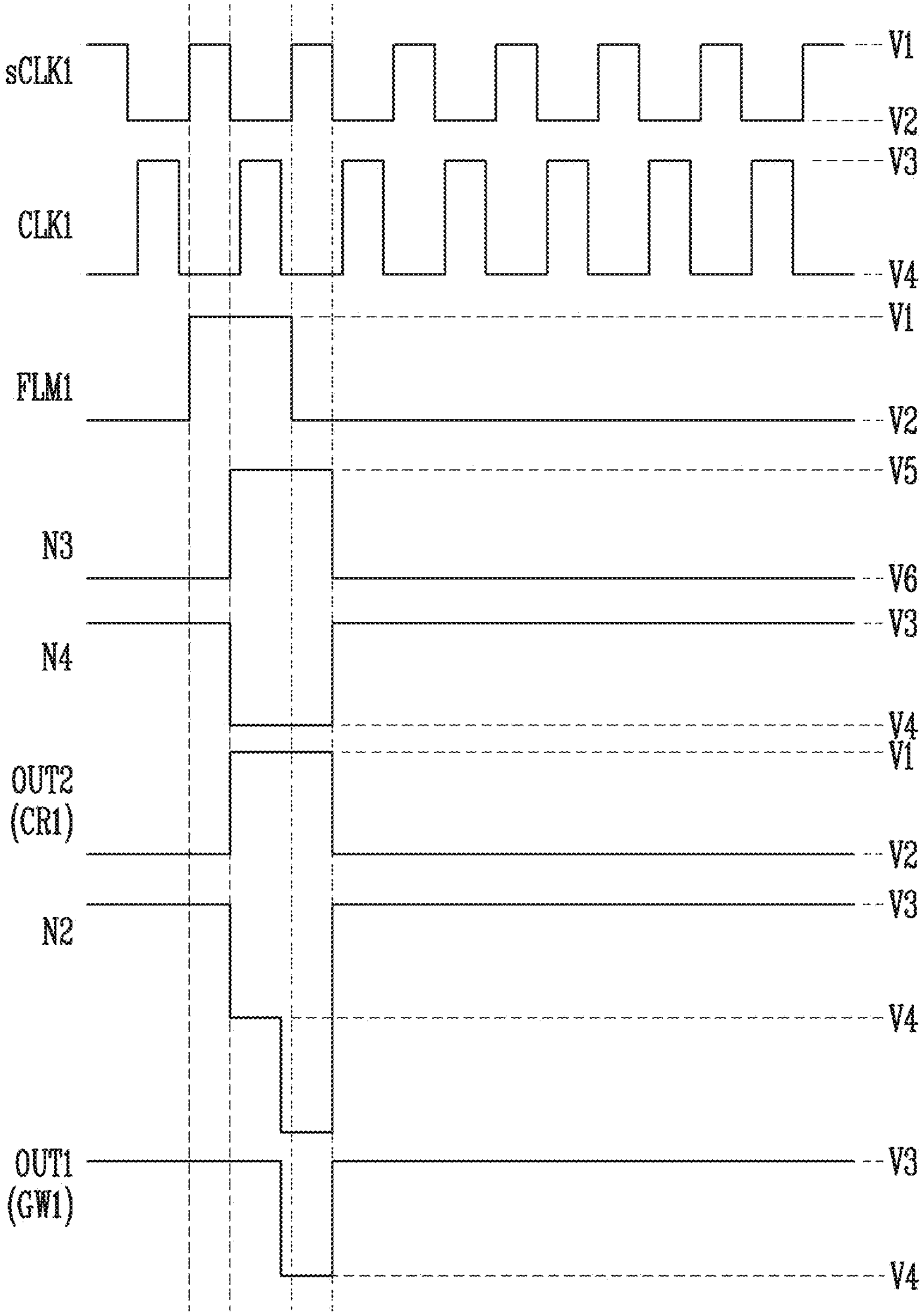

FIGS. 9 and 10 are waveform diagrams illustrating aspects of a driving method of the stage circuit shown in FIGS. 8A and 8B according to some embodiments.

Referring to FIGS. 8A to 9, first, at a first time t1, the first scan start signal FLM1 having a high level may be input to the first input terminal IN1. The high level of the first scan start signal FLM1 may be set to a first voltage V1, and a low level (or low voltage) of the first scan start signal FLM1 may be set to a second voltage V2. At the first time t1, the auxiliary first clock signal sCLK1 having a high level may be input to the second input terminal IN2. When the auxiliary first clock signal sCLK1 having the high level is input to the second input terminal IN2, the first transistor M1 may maintain a turn-off state.

At a second time t2, the auxiliary first clock signal sCLK1 having a low level may be input to the second input terminal IN2. When the auxiliary first clock signal sCLK1 having the low level is input to the second input terminal IN2, the first transistor M1 may be turned on. When the first transistor M1 is turned on, the first scan start signal FLM1 having the first voltage V1 may be supplied to the third node N3. When the first voltage V1 is supplied to the third node N3, the eighth transistor M8 may be turned on. Also, when the first voltage V1 is supplied to the third node N3, the tenth transistor M10, the sixth transistor M6, and the third transistor M3 may be turned off.

When the tenth transistor M10 is turned off, the electrical connection between the second output terminal OUT2 and the second power input terminal VIN2 is blocked. When the sixth transistor M6 is turned off, the electrical connection between the fifth node N5 and the fourth power input terminal VIN4 may be blocked. When the third transistor M3 is turned off, an electrical connection between the first output terminal OUT1 and the third power input terminal VIN3 may be blocked.

When the eighth transistor M8 is turned on, the voltage (i.e., a fourth voltage V4) of the second power source VGL may be supplied to the fourth node N4. When the voltage of the fourth node N4 is as the fourth voltage V4, the voltage of the second node N2 may also be set as the fourth voltage V4. When the voltage of the second node N2 is set as the fourth voltage V4, the second transistor M2 may be turned on.

When the voltage of the fourth node N4 is set as the fourth voltage V4, the fifth transistor M5 and the ninth transistor M9 may be turned on.

When the ninth transistor M9 is turned on, the first power input terminal VIN1 and the second output terminal OUT2 may be electrically connected to each other. Then, the voltage (i.e., the first voltage V1) of the auxiliary first power source sVGH may be output to the second output terminal OUT2. The first voltage V1 output to the second output terminal OUT2 may be supplied as the first carry signal CR1 to a next stage circuit.

When the fifth transistor M5 is turned on, the voltage (i.e., a third voltage V3) of the first power source VGH may be supplied to the fifth node N5. When the third voltage V3 is supplied to the fifth node N5, the seventh transistor M7 may be turned off. Also, when the third voltage V3 is supplied to the fifth node N5, the voltage of the third node N3 is increased by coupling of the second capacitor C2. According to some embodiments, the voltage of the third node N3 may be increased to a fifth voltage V5. According to some embodiments, the fifth voltage V5 may be a voltage higher than the first voltage V1. According to some embodiments, the fifth voltage V5 may be a voltage higher than the third voltage V3.

Although the voltage of the third node N3 is increased to the fifth voltage V5, the fifth voltage V5 of the third node N3 may be stably maintained by the second voltage controller 206. At the second time t2, the voltage of the third node N3 may be set as a voltage (i.e., the fifth voltage V5) higher than the first voltage V1, and the voltage of the fourth node N4 may be set as a voltage (i.e., the fourth voltage V4) lower than the second voltage V2.

At a third time t3, the first clock signal CLK1 having a low level may be supplied to the third input terminal IN3. The first clock signal CLK1 having the low level may be supplied as an enable first scan signal GW1 to the first output terminal OUT1 via the second transistor M2.

When the first clock signal CLK1 having the low level is input to the first output terminal OUT1, the voltage of the second node N2 may be decreased to a voltage lower than the fourth voltage V4. The fourth voltage V4 of the fourth node N4 may be maintained by the fourth transistor M4.

At a fourth time t4, the supply of the first scan start signal FLM1 to the first input terminal IN1 may be suspended, and accordingly, the second voltage V2 may be supplied to the first input terminal IN1. At the fourth time t4, the auxiliary first clock signal sCLK1 having the high level may be input to the second input terminal IN2. When the auxiliary first clock signal sCLK1 having the high level is input to the second input terminal IN2, the first transistor M1 may maintain a turn-off state.

At a fifth time t5, the auxiliary first clock signal sCLK1 having the low level may be input to the second input terminal IN2. When the auxiliary first clock signal sCLK1 having the low level is input to the second input terminal IN2, the first transistor M1 is turned on. When the first transistor M1 is turned on, the second voltage V2 may be supplied to the third node N3.

When the second voltage V2 is supplied to the third node N3, the eighth transistor M8 may be turned off, and the tenth transistor M10, the sixth transistor M6, and the third transistor M3 may be turned on.

When the tenth transistor M10 is turned on, the voltage (i.e., the second voltage V2) of the auxiliary second power source sVGL may be supplied to the second output terminal OUT2. The supply of the first carry signal CR1 to the second output terminal OUT2 may be suspended.

When the third transistor M3 is turned on, the voltage (i.e., the third voltage V3) of the first power source VGH may be supplied to the first output terminal OUT1. The third voltage V3 may be supplied as a disable first scan signal GW1 to the first output terminal OUT1.

When the sixth transistor M6 is turned on, the voltage (i.e., the fourth voltage V4) of the second power source VGL may be supplied to the fifth node N5. When the fourth voltage V4 is supplied to the fifth node N5, the voltage of the third node N3 may be decreased to a sixth voltage V6 by the second capacitor C2. According to some embodiments, the sixth voltage V6 may be a voltage lower than the second voltage V2. According to some embodiments, the sixth voltage V6 may be a voltage lower than the fourth voltage V4.

Although the voltage of the third node N3 is decreased to the sixth voltage V6, the sixth voltage V6 of the third node N3 may be stably maintained by the second voltage controller 206. Also, when the voltage of the third node N3 is decreased to the sixth voltage V6, the third transistor M3 may stably maintain a turn-on state, and accordingly, the stability of driving can be ensured.

When the fourth voltage V4 is supplied to the fifth node N5, the seventh transistor M7 may be turned on. When the seventh transistor M7 is turned on, the voltage (i.e., the third voltage V3) of the first power source VGH may be supplied to the fourth node N4. Then, the voltage of the second node N2 may be set as the third voltage V3, and accordingly, the second transistor M2 may be turned off.

FIGS. 8A to 9 illustrate the first stage circuit ST1 and an operating process thereof. A circuit configuration of each of the other stage circuits ST2 to STn except the first stage circuit ST1 may be substantially identical to the circuit configuration of the first stage circuit. However, a carry signal CR may be input to a first input terminal IN1 of each of the other stage circuits ST2 to STn. In addition, the auxiliary second clock signal sCLK2 may be input to a second input terminal IN2 of each of even-numbered stage circuits ST2, . . . , and STn, and the second clock signal CLK2 may be input to a third input terminal IN3 of each of the even-numbered stage circuits ST2, . . . , and STn. An operating process of each of the even-numbered stage circuits ST2, . . . , and STn may be substantially identical to the operating process of the first stage circuit ST1.

Meanwhile, in FIG. 9, it is illustrated that a plurality of enable first scan signals GW1 are output to the first output terminal OUT1. However, embodiments of the present disclosure are not limited thereto. According to some embodiments, as shown in FIG. 10, when the width of the first scan start signal FLM1 is controlled, one enable first scan signal GW1 may be output to the first output terminal OUT1. An operating process of the stage circuit ST1 according to the waveform diagram shown in FIG. 10 may be substantially identical to the operating process of the stage circuit ST1 according to the waveform diagram shown in FIG. 9, and detailed description related to this will be omitted.

Figure 11:
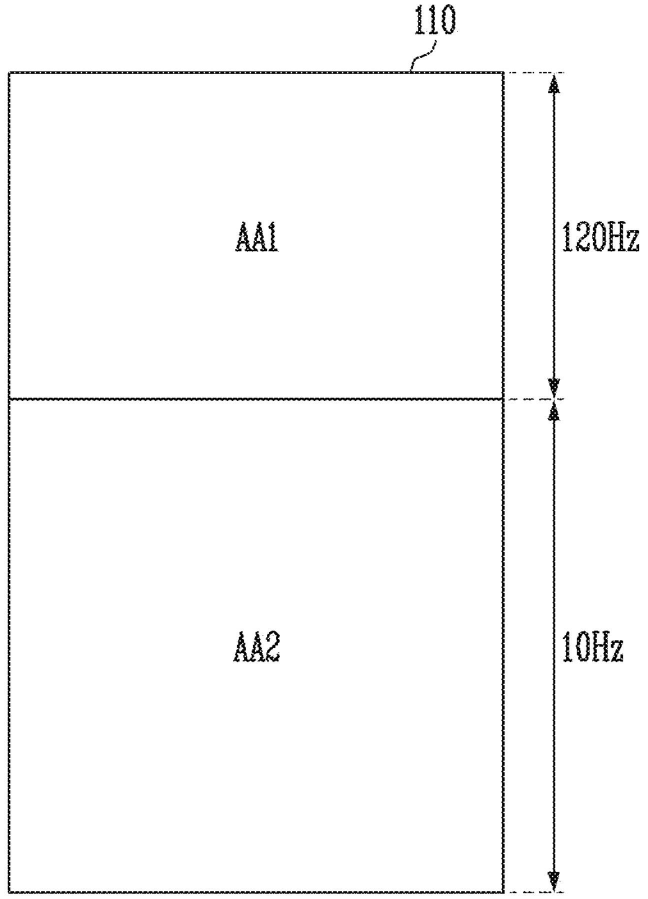
FIG. 11 is a diagram illustrating a case where images are displayed at different image refresh rates on the display unit.

FIG. 11 is a diagram illustrating a case where images are displayed at different image refresh rates on the display unit.

Referring to FIG. 11, images may be displayed at a first image refresh rate in a first area AA1 of the display unit 110, and images may be displayed at a second image refresh rate in a second area AA2 of the display unit 110. The first image refresh rate may be 120 Hz, and a moving image may be displayed in the first area AA1. The second image refresh rate may be 10 Hz, and a still image may be displayed in the second area AA2.

The scan driver 130 may supply an enable first scan signal GW 120 times per second to the first area AA1, and supply an enable first scan signal GW 10 times per second to the second area AA2.

Figure 12:
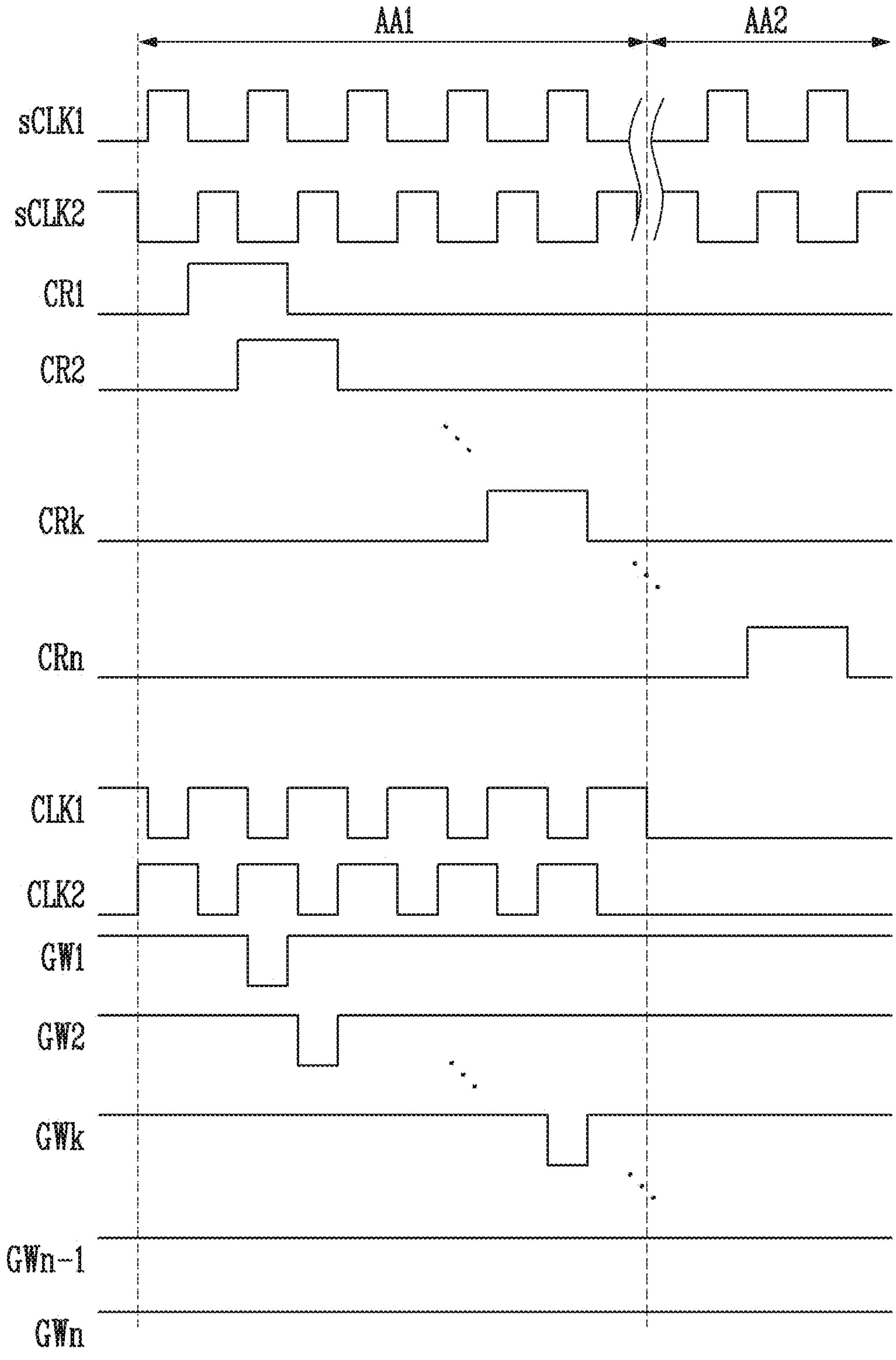
FIG. 12 is a diagram illustrating aspects of a first scan signal supplied to the display unit shown in FIG. 11 according to some embodiments.

FIG. 12 is a diagram illustrating a first scan signal supplied to the display unit shown in FIG. 11 according to some embodiments.

Referring to FIG. 12, the scan driver 130 (or the first scan driver 132) may sequentially generate carry signals CR1, CR2, . . . , CRk, . . . , CRn (k is a natural number of 3 or more and n or less), corresponding to auxiliary clock signals sCLK1 and sCLK2. The scan driver 130 may generate the carry signals CR1 to CRn, corresponding to 120 Hz. That is, the scan driver 130 may generate the carry signals, corresponding to the first image refresh rate.

The carry signals CR1 to CRn may be generated by the auxiliary clock signals sCLK1 and sCLK2, the auxiliary first power source sVGH, and the auxiliary second power source sVGL as shown in FIGS. 8A and 8B. Power consumption used to generate the carry signals CR1 to CRn can be minimized or reduced.

The scan driver 130 may sequentially output enable first scan signals GW1, GW2, . . . , and GWk to the first area AA1, corresponding to 120 Hz. To this end, the timing controller 120 may supply the clock signals CLK1 and CLK2 such that the enable first scan signals GW1 to GWk are output at the first image refresh rate in the first area AA1.

The scan driver 130 may output enable first scan signals . . . , GWn−1, and GWn to the second area AA2, corresponding to 10 Hz. To this end, the timing controller 120 may control whether the clock signals CLK1 and CLK2 are to be supplied such that the enable first scan signals . . . , GWn−1, and GWn at the second image refresh rate in the second area AA2.

According to some embodiments, when the enable first scan signals . . . , GWn−1, and GWn are not supplied to the second area AA2, the clock signals CLK1 and CLK2 may maintain a low level (i.e., the fourth voltage V4) during a corresponding period. That is, the timing controller 120 may supply a first scan signal GW at various image refresh rates in a plurality of areas of the display unit 110 while controlling whether the clock signals CLK1 and CLK2 are to be supplied. The power consumption of the scan driver 130 can be minimized or reduced, and the plurality of areas of the display unit 110 can be driven at different image refresh rates.

Figure 13:
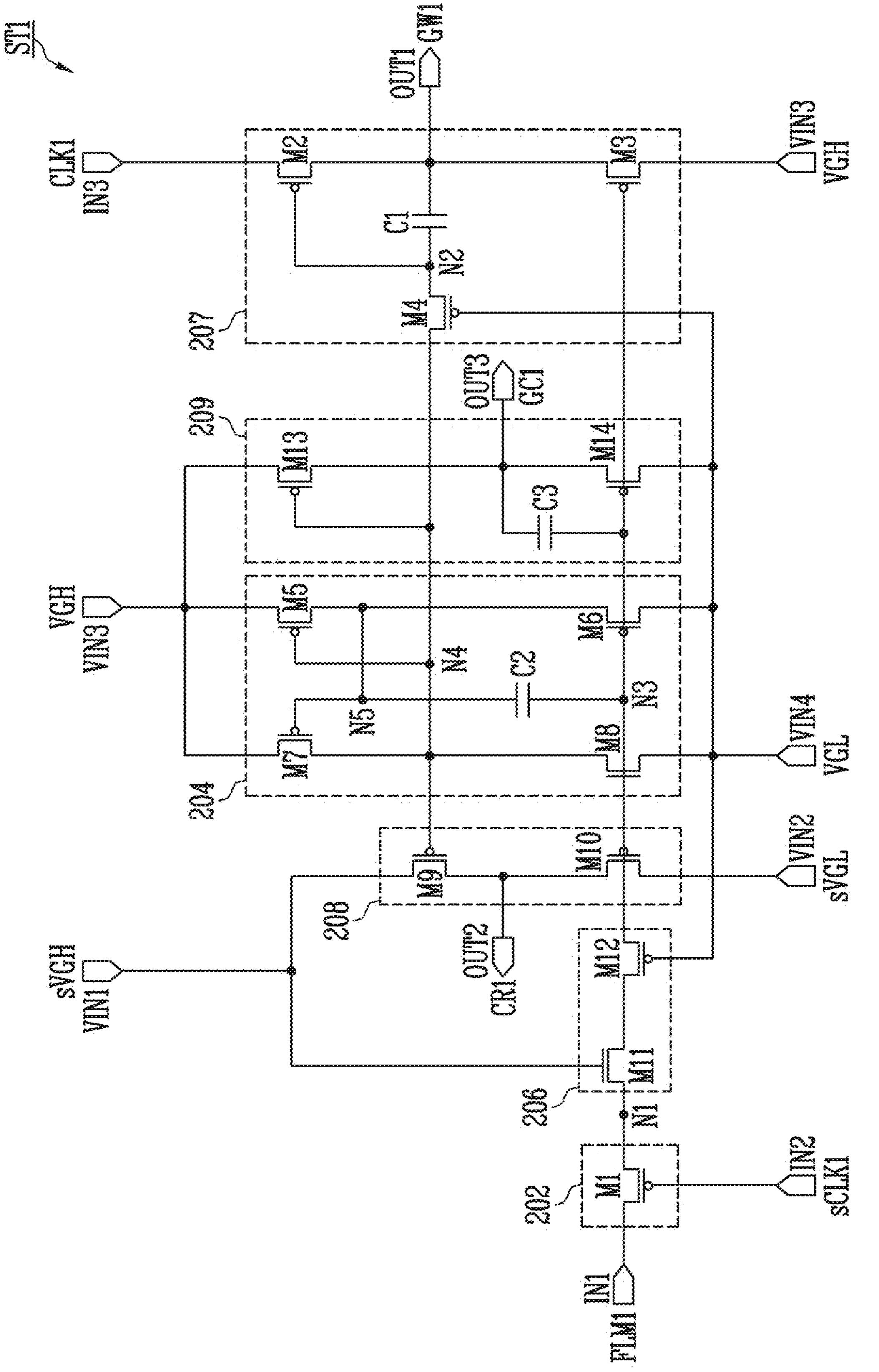
FIG. 13 is a circuit diagram illustrating aspects of the stage circuit shown in FIG. 6 according to some embodiments.

FIG. 13 is a circuit diagram illustrating aspects of the stage circuit shown in FIG. 6 according to some embodiments. Although FIG. 13 illustrates various components that may be included in a stage circuit, embodiments according to the present disclosure are not limited thereto, and according to some embodiments, the stage circuit may include additional components or fewer components without departing from the spirit and scope of embodiments according to the present disclosure. In FIG. 13, for convenience of description, a first stage circuit ST1 will be illustrated. In FIG. 13, components identical to the components shown in FIG. 8A are designated by like reference numerals, and overlapping descriptions will be omitted.

Referring to FIG. 13, the first stage circuit ST1 according to some embodiments of the present disclosure may include an input unit 202, a first voltage controller 204, a first output unit 207, a second output unit 208, a third output unit 209, and a second voltage controller 206.

The third output unit 209 may output a second scan signal GC1 to a third output terminal OUT3, corresponding to a voltage of each of a third node N3 and a fourth node N4. To this end, the third output unit 209 may include a thirteenth transistor M13, a fourteenth transistor M14, and a third capacitor C3.

The thirteenth transistor M13 (or first output transistor) may be connected between a third power input terminal VIN3 and the third output terminal OUT3. In addition, a gate electrode of the thirteenth transistor M13 may be connected to the fourth node N4. The thirteenth transistor M13 may control an electrical connection between the third power input terminal VIN3 and the third output terminal OUT3 while being turned on or turned off corresponding to a voltage of the fourth node N4.

The fourteenth transistor M14 (or second output transistor) may be connected between the third output terminal OUT3 and a fourth power input terminal VIN4. In addition, a gate electrode of the fourteenth transistor M14 may be connected to the third node N3. The fourteenth transistor M14 may control an electrical connection between the third output terminal OUT3 and the fourth power input terminal VIN4 while being turned on or turned off corresponding to a voltage of the third node N3.

The third capacitor C3 may be connected between the third node N3 and the third output terminal OUT3. The third capacitor C3 may store the voltage of the third node N3.

According to some embodiments, the thirteenth transistor M13 and the fourteenth transistor M14 may include a poly-silicon semiconductor layer formed as an active layer (channel) through a low temperature poly-silicon (LTPS) process. In addition, the thirteenth transistor M13 and the fourteenth transistor M14 may be implemented with a P-type transistor (e.g., a PMOS transistor). Accordingly, a gate-on voltage at which the thirteenth transistor M13 and the fourteenth transistor M14 are turned on may have a logic low level.

Figure 14:
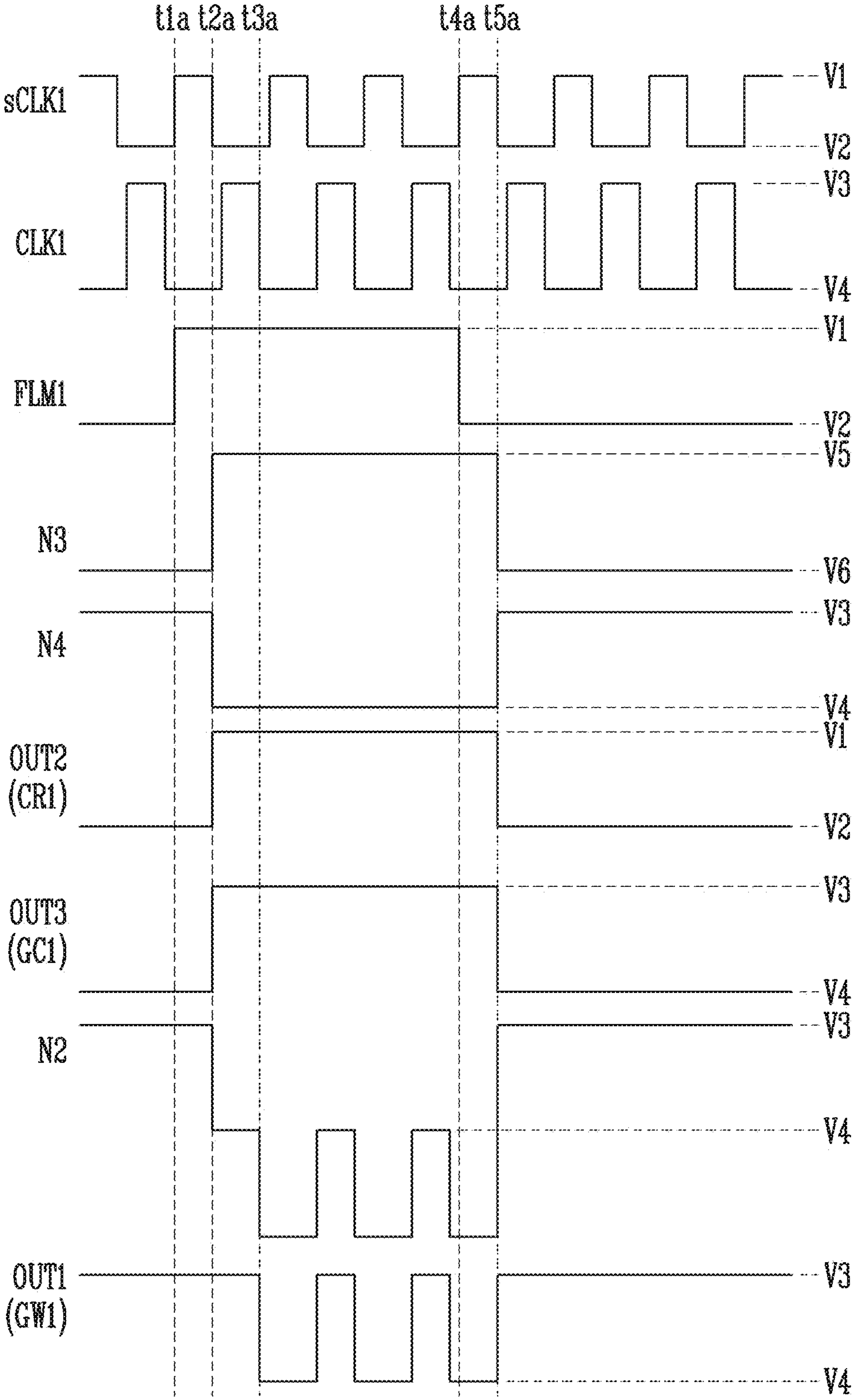
FIG. 14 is a diagram illustrating aspects of a driving method of the stage circuit shown in FIG. 13 according to some embodiments.

FIG. 14 is a diagram illustrating aspects of a driving method of the stage circuit shown in FIG. 13 according to some embodiments. In FIG. 14, portions similar or identical to the portions described with reference to FIG. 9 will be briefly described.

Referring to FIG. 14, first, at a first time t1*a*, the first scan start signal FLM1 having a first voltage V1 may be input to a first input terminal IN1. At the first time t1*a*, a first transistor M1 may maintain a turn-off state.

At a second time t2*a*, the auxiliary first clock signal sCLK1 having a second voltage V2 may be input to a second input terminal IN2, and accordingly, the first transistor M1 may be turned on. When the first transistor M1 is turned on, the first voltage V1 may be supplied to the third node N3. When the first voltage V1 is supplied to the third node N3, an eighth transistor M8 may be turned on. Also, when the first voltage V1 is supplied to the third node N3, a tenth transistor M10, a sixth transistor M6, the fourteenth transistor M14, and a third transistor M3 may be turned off. When the fourteenth transistor M14 is turned off, the fourth power input terminal VIN4 and the third output terminal OUT3 may be electrically blocked.

When the eighth transistor M8 is turned on, the voltage (i.e., a fourth voltage V4) of the second power source VGL may be supplied to the fourth node N4. When the voltage of the fourth node N4 is set as the fourth voltage V4, the voltage of a second node N2 may be set as the fourth voltage V4. When the voltage of the second node N2 is set as the fourth voltage, a second transistor M2 may be turned on.

When the voltage of the fourth node N4 is set as the fourth voltage V4, a fifth transistor M5, a ninth transistor M9, and the thirteenth transistor M13 may be turned on.

When the ninth transistor M9 is turned on, the voltage (i.e., the first voltage V1) of the auxiliary first power source sVGH may be output to a second output terminal OUT2. The first voltage V1 output to the second output terminal OUT2 may be supplied as the first carry signal CR1 to a next stage circuit.

When the fifth transistor M5 is turned on, the voltage (i.e., a third voltage V3) of the first power source VGH may be supplied to a fifth node N5. When the third voltage V3 is supplied to the fifth node N5, the voltage of the third node N3 may be increased by coupling of a second capacitor C2. According to some embodiments, the voltage of the third node N3 may be increased to a fifth voltage V5.

When the thirteenth transistor M13 is turned on, the third output terminal OUT3 and the third power input terminal VIN3 may be electrically connected to each other. Then, the voltage (i.e., the third voltage V3) of the first power source VGH may be supplied to the third output terminal OUT3. The third voltage V3 supplied to the third output terminal OUT3 may be supplied as an enable second scan signal GC1 to the second scan line SL21.

At a third time t3*a*, the first clock signal CLK1 having a low level may be supplied to a third input terminal IN3. The first clock signal CLK1 having the low level may be supplied as an enable first scan signal GW1 to a first output terminal OUT1 via the second transistor M2.

When the first clock signal CLK1 having the low level is input to the first output terminal OUT1, the voltage of the second node N2 may be decreased to a voltage lower than the fourth voltage V4. The fourth voltage V4 of the fourth node N4 may be maintained by a fourth transistor M4.

At a fourth time t4*a*, the supply of the first scan start signal FLM1 to the first input terminal IN1 may be suspended, and accordingly, the second voltage V2 may be supplied to the first input terminal IN1.

At a fifth time t5*a*, the auxiliary first clock signal sCLK1 having the second voltage may be input to the second input terminal IN2, and accordingly, the first transistor M1 may be turned on. When the first transistor M1 is turned on, the second voltage V2 may be supplied to the third node N3.

When the second voltage V2 is supplied to the third node N3, the eighth transistor M8 may be turned off, and the tenth transistor M10, the sixth transistor M6, the fourteenth transistor M14, and the third transistor M3 may be turned on.

When the third transistor M3 is turned on, the voltage (i.e., the third voltage V3) of the first power source VGH may be supplied to the first output terminal OUT1. The third voltage V3 may be supplied as a disable first scan signal GW1 to the first output terminal OUT1.

When the tenth transistor M10 is turned on, the voltage (i.e., the second voltage V2) of the auxiliary second power source sVGL may be supplied to the second output terminal OUT2. The output of the first carry signal CR1 may be suspended.

When the sixth transistor M6 is turned on, the voltage (i.e., the fourth voltage V4) of the second power source VGL may be supplied to the fifth node N5. When the fourth voltage V4 is supplied to the fifth node N5, the voltage of the third node N3 may be decreased to a sixth voltage V6 by the second capacitor C2. When the fourth voltage V4 is supplied to the fifth node N5, a seventh transistor M7 may be turned on. When the seventh transistor M7 is turned on, the voltage (i.e., the third voltage V3) of the first power source VGH may be supplied to the fourth node N4. Then, the voltage of the second node N2 may also be set as the third voltage V3, and accordingly, the second transistor M2 may be turned off.

When the fourteenth transistor M14 is turned on, the voltage (i.e., the fourth voltage V4) of the second power source VGL may be supplied to the third output terminal OUT3. The supply of the enable second scan signal GC1 may be suspended.

As described above, the stage circuit ST1 shown in FIG. 13 may output the enable first scan signal GW1 and the enable second scan signal GC1. Meanwhile, the ith third scan line SL3*i* shown in FIG. 3 may be set as an (i−1)th second scan line SL2*i*−1, and the ith fourth scan line SL4*i* shown in FIG. 3 may be set as an (i−1)th first scan line SL1*i*−1. Scan signals of all scan lines SL1, SL2, SL3, and SL4 can be supplied using the stage circuit ST1.

Figure 15:
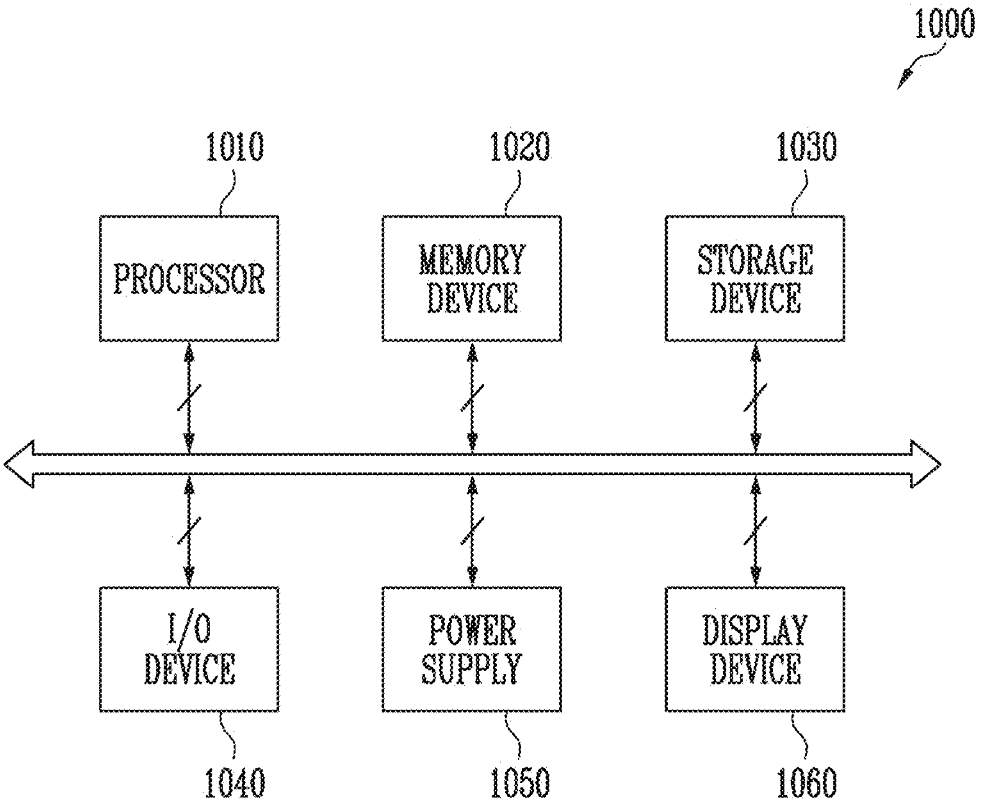
FIG. 15 is a schematic block diagram illustrating an electronic device including a display device in accordance with an embodiment.
Figure 16:
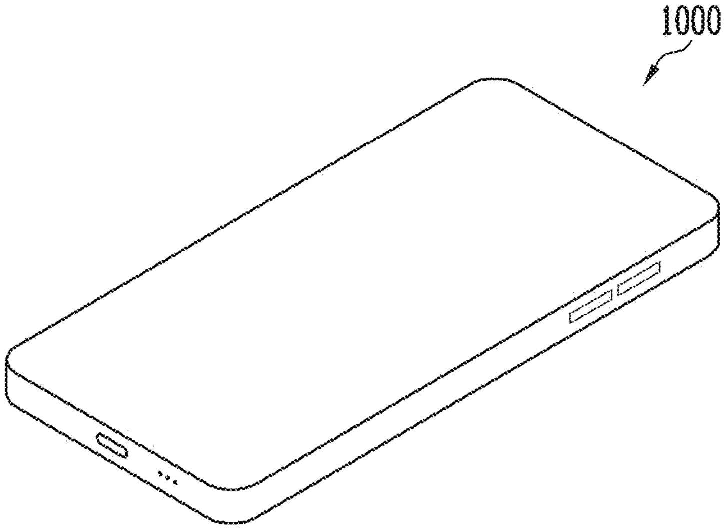
FIG. 16 is a schematic diagram illustrating an example where the electronic device of FIG. 15 is a smartphone.
Figure 17:
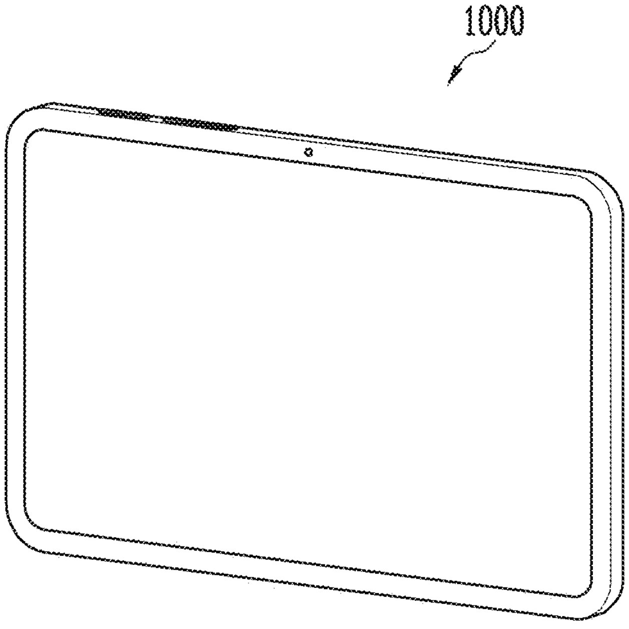
FIG. 17 is a schematic diagram illustrating an example where the electronic device of FIG. 15 is a tablet computer.

FIG. 15 is a schematic block diagram illustrating an electronic device 1000 including a display device in accordance with an embodiment. FIG. 16 is a schematic diagram illustrating an example where the electronic device 1000 of FIG. 15 is a smartphone. FIG. 17 is a schematic diagram illustrating an example where the electronic device 1000 of FIG. 15 is a tablet computer.

Referring to FIGS. 15 to 17, the electronic device 1000 may include a processor 1010, a memory device 1020, a storage device 1030, an input/output (I/O) device 1040, a power supply 1050, and a display device 1060. The display device 1060 may be the display device 100 of FIG. 1. The electronic device 1000 may further include various ports for communication with a video card, a sound card, a memory card, a USB device, or other systems. In an embodiment, as illustrated in FIG. 16, the electronic device 1000 may be a smartphone. In an embodiment, as illustrated in FIG. 17, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

In the stage circuit and the display device including the same in accordance with the present disclosure, a carry signal is generated using a low voltage, and a scan signal is generated using a high voltage. Accordingly, power consumption for generating the carry signal can be minimized or reduced.

Also, in the stage circuit and the display device including the same in accordance with the present disclosure, a carry signal and a scan signal are generated using different clock signals, and accordingly, various driving methods can be applied.

Also, in the stage circuit and the display device including the same in accordance with the present disclosure, a scan signal having a high voltage and a scan signal having a low voltage can be generated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A stage circuit comprising:

an input unit located between a first input terminal configured to receive a scan start signal or a carry signal and a first node, the input unit being configured to control an electrical connection between the first input terminal and the first node, corresponding to an auxiliary clock signal input to a second input terminal;

a first voltage controller connected to a first main power input terminal and a second main power input terminal, the first voltage controller being configured to control each of a second node, a third node, and a fourth node to have a voltage higher or lower than a voltage of the first node, corresponding to the voltage of the first node;

a first output unit connected to a third input terminal configured to receive a clock signal and the first main power input terminal, the first output unit being configured to output a first scan signal to a first output terminal, corresponding to the voltage of each of the second node and the third node;

a second output unit connected to a first auxiliary power input terminal and a second auxiliary power input terminal, the second output unit being configured to output a carry signal to a second output terminal, corresponding to the voltage of each of the third node and the fourth node; and a second voltage controller connected to the first auxiliary power input terminal, the second voltage controller being connected to the second main power input terminal or the second auxiliary power input terminal, the second voltage controller being located between the first node and the third node to maintain the voltage of the third node.

2. The stage circuit of claim 1, wherein the auxiliary clock signal and the clock signal have a same cycle and different phases, and wherein the auxiliary clock signal swings between a first voltage and a second voltage, and the clock signal swings between a third voltage higher than the first voltage and a fourth voltage lower than the second voltage.

3. The stage circuit of claim 2, wherein the first auxiliary power input terminal is configured to receive an auxiliary first power source having the first voltage, the second auxiliary power input terminal is configured to receive an auxiliary second power source having the second voltage, the first main power input terminal is configured to receive a first power source having the third voltage, and the second main power input terminal is configured to receive a second power source having the fourth voltage.

4. The stage circuit of claim 3, wherein the second voltage controller includes an N-type first voltage control transistor and a P-type second voltage control transistor, which are connected in series between the first node and the third node, and wherein a gate electrode of the first voltage control transistor is connected to the first auxiliary power input terminal, and a gate electrode of the second voltage control transistor is connected to the second main power input terminal.

5. The stage circuit of claim 3, wherein the second voltage controller includes an N-type first voltage control transistor and a P-type second voltage control transistor, which are connected in series between the first node and the third node, and wherein a gate electrode of the first voltage control transistor is connected to the first auxiliary power input terminal, and a gate electrode of the second voltage control transistor is connected to the second auxiliary power input terminal.

6. The stage circuit of claim 3, wherein the input unit includes a first transistor connected between the first input terminal and the first node, the first transistor including a gate electrode connected to the second input terminal.

7. The stage circuit of claim 3, wherein the first output unit includes:

a first scan output transistor connected between the third input terminal and the first output terminal, the first scan output transistor including a gate electrode connected to the second node;

a second scan output transistor connected between the first output terminal and the first main power input terminal, the second scan output transistor including a gate electrode connected to the third node;

a control transistor connected between the second node and the fourth node, the control transistor including a gate electrode connected to the second main power input terminal; and a first capacitor connected between the second node and the first output terminal.

8. The stage circuit of claim 3, wherein the second output unit includes:

a first carry output transistor connected between the first auxiliary power input terminal and the second output terminal, the first carry output transistor including a gate electrode connected to the fourth node; and a second carry output transistor connected between the second output terminal and the second auxiliary power input terminal, the second carry output transistor including a gate electrode connected to the third node.

9. The stage circuit of claim 3, wherein the first voltage controller includes:

a first control transistor connected between the first main power input terminal and a fifth node, the first control transistor including a gate electrode connected to the fourth node;

a second control transistor connected between the fifth node and the second main power input terminal, the second control transistor including a gate electrode connected to the third node;

a third control transistor connected between the first main power input terminal and the fourth node, the third control transistor including a gate electrode connected to the fifth node;

a fourth control transistor connected between the fourth node and the second main power input terminal, the fourth control transistor including a gate electrode connected to the third node; and a second capacitor connected between the fifth node and the third node.

10. The stage circuit of claim 9, wherein each of the first control transistor, the second control transistor, and the third control transistor is a P-type transistor, and the fourth control transistor is an N-type transistor.

11. The stage circuit of claim 3, further comprising a third output unit connected to the first main power input terminal and the second main power input terminal, the third output unit being configured to output a second scan signal to a third output terminal, corresponding to the voltage of each of the third node and the fourth node.

12. The stage circuit of claim 11, wherein the third output unit includes:

a first output transistor connected between the first main power input terminal and the third output terminal, the first output transistor including a gate electrode connected to the fourth node;

a second output transistor connected between the third output terminal and the second main power input terminal, the second output transistor including a gate electrode connected to the third node; and a third capacitor connected between the third node and the third output terminal.

13. A stage circuit comprising:

a first output unit configured to output a scan signal, using a clock signal and a first power source;

an input unit configured to receive a scan start signal or a carry signal, corresponding to an auxiliary clock signal having a voltage different from a voltage of the clock signal; and a second output unit configured to output a carry signal, using an auxiliary first power source and an auxiliary second power source, each of which has a voltage different from a voltage of the first power source, wherein the auxiliary clock signal swings between a first voltage and a second voltage, and the clock signal swings between a third voltage higher than the first voltage and a fourth voltage lower than the second voltage.

14. The stage circuit of claim 13, wherein the auxiliary clock signal and the clock signal have a same cycle and different phases.

15. The stage circuit of claim 14, wherein the auxiliary first power source has the first voltage, the auxiliary second power source has the second voltage, and the first power source has the third voltage.

16. A display device comprising:

a display unit including pixels located to be connected to scan lines and data lines; and a scan driver including stage circuits to drive the scan lines, wherein the stage circuits are configured to:

generate a carry signal, using an auxiliary clock signal swinging between a first voltage and a second voltage, a first auxiliary power source having the first voltage, and a second auxiliary power source having the second voltage; and generate a scan signal, using a clock signal swinging between a third voltage higher than the first voltage and a fourth voltage lower than the second voltage, a first power source having the third voltage, and a second power source having the fourth voltage.

17. The display device of claim 16, wherein, based on a first area of the display unit being driven at a first image refresh rate and a second area of the display unit being driven at a second image refresh rate lower than the first image refresh rate, the scan driver is configured to generate the carry signal, corresponding to the first image refresh rate.

18. The display device of claim 17, further comprising a timing controller configured to control the scan driver, wherein the timing controller is configured to control whether the clock signal is to be supplied such that the scan signal is output at the second image refresh rate in the second area.

19. The display device of claim 16, wherein each of the stage circuits includes a first input terminal, a second input terminal, a third input terminal, a first auxiliary power input terminal, a second auxiliary power input terminal, a first main power input terminal, a second main power input terminal, a first output terminal, and a second output terminal, wherein the first input terminal is configured to receive a scan start signal or a carry signal of a previous stage circuit, wherein a second input terminal of an odd-numbered stage circuit is configured to receive a first auxiliary clock signal, and a second input terminal of an even-numbered stage circuit is configured to receive a second auxiliary clock signal, wherein a third input terminal of an odd-numbered stage circuit is configured to receive a first clock signal, and a third input terminal of an even-numbered stage circuit is configured to receive a second clock signal, wherein the first auxiliary power input terminal is configured to receive the first auxiliary power source, the second auxiliary power input terminal is configured to receive the second auxiliary power source, the first main power input terminal is configured to receive the first power source, and the second main power input terminal is configured to receive the second power source, wherein the first auxiliary clock signal and the second auxiliary clock signal have a same cycle and different phases, and wherein the first clock signal and the second clock signal have a same cycle and different phases.

20. The display device of claim 19, wherein each of the stage circuits includes:

an input unit located between the first input terminal and a first node, the input unit being configured to control an electrical connection between the first input terminal and the first node, corresponding to a voltage of the second input terminal;

a first voltage controller connected to the first main power input terminal and the second main power input terminal, the first voltage controller being configured to control each of a second node, a third node, and a fourth node to have a voltage higher or lower than a voltage of the first node, corresponding to the voltage of the first node;

a first output unit connected to the third input terminal and the first main power input terminal, the first output unit being configured to output the scan signal to a first output terminal, corresponding to the voltage of each of the second node and the third node;

a second output unit connected to the first auxiliary power input terminal and the second auxiliary power input terminal, the second output unit being configured to output the carry signal to a second output terminal, corresponding to the voltage of each of the third node and the fourth node, and a second voltage controller connected to the first auxiliary power input terminal, the second voltage controller being connected to the second main power input terminal or the second auxiliary power input terminal, the second voltage controller being located between the first node and the third node to maintain the voltage of the third node.

21. An electronic device, comprising:

a processor to provide input image data;

a display device to display an image based on the input image data; and wherein the display device comprising:

a display unit including pixels located to be connected to scan lines and data lines; and a scan driver including stage circuits to drive the scan lines, wherein the stage circuits are configured to:

generate a carry signal, using an auxiliary clock signal swinging between a first voltage and a second voltage, a first auxiliary power source having the first voltage, and a second auxiliary power source having the second voltage; and generate a scan signal, using a clock signal swinging between a third voltage higher than the first voltage and a fourth voltage lower than the second voltage, a first power source having the third voltage, and a second power source having the fourth voltage.

* * * * *